(12) United States Patent
Fujiwara et al.

(10) Patent No.: US 7,243,390 B2
(45) Date of Patent: Jul. 17, 2007

(54) CLEANING UNIT FOR OPTICAL CONNECTOR AND CLEANING TOOL FOR OPTICAL CONNECTOR

(75) Inventors: Kunihiko Fujiwara, Sakura (JP); Takaaki Ishikawa, Sakura (JP); Yuwa Tanaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 535 days.

(21) Appl. No.: 10/349,197

(22) Filed: Jan. 22, 2003

(65) Prior Publication Data

US 2004/0103491 A1 Jun. 3, 2004

(30) Foreign Application Priority Data

Dec. 2, 2002 (JP) ............... P2002-350469
Jan. 17, 2003 (JP) ............... P2003-009759

(51) Int. Cl.
*B08B 1/00* (2006.01)
(52) U.S. Cl. .............. 15/97.1; 15/210.1; 385/134
(58) Field of Classification Search ............ 15/97.1, 15/210.1; 385/134
See application file for complete search history.

(56) References Cited

U.S. PATENT DOCUMENTS

| | | | | |
|---|---|---|---|---|
| 2,424,509 A | * | 7/1947 | Singer | 15/97.1 |
| RE30,175 E | * | 12/1979 | Mier | 15/104.33 |
| 4,486,911 A | * | 12/1984 | Beke | 15/21.1 |
| 4,654,917 A | * | 4/1987 | Yeung | 15/97.1 |
| 4,716,613 A | * | 1/1988 | Irwin | 15/104.33 |
| 5,265,301 A | * | 11/1993 | Irwin | 15/104.33 |
| 5,878,458 A | * | 3/1999 | Higginbotham | 15/104.94 |
| 6,209,163 B1 | * | 4/2001 | Clairadin et al. | 15/97.1 |

FOREIGN PATENT DOCUMENTS

JP 2000-284147 A1 10/2000

OTHER PUBLICATIONS

Japanese Unexamined Patent Application, Publication No. 2000-284147, published Oct. 13, 2000, (Abstract).

* cited by examiner

*Primary Examiner*—Mark Spisich
(74) *Attorney, Agent, or Firm*—Darby & Darby

(57) ABSTRACT

A join end face of an optical connector is easily and reliably cleaned when the optical connector has been inserted into a connector housing, by using an optical connector cleaning unit comprising a cleaning member which wipes clean a join end face of an optical connector inside a connector housing by relative motion against the join end face, a drive mechanism which drives the cleaning member, and a connection section which enables a drive auxiliary mechanism for applying a moving force to the drive mechanism to be connected, and an optical connector cleaning tool in which a drive auxiliary unit comprising the drive auxiliary mechanism has been connected to the connection section of the optical connector cleaning unit.

5 Claims, 19 Drawing Sheets

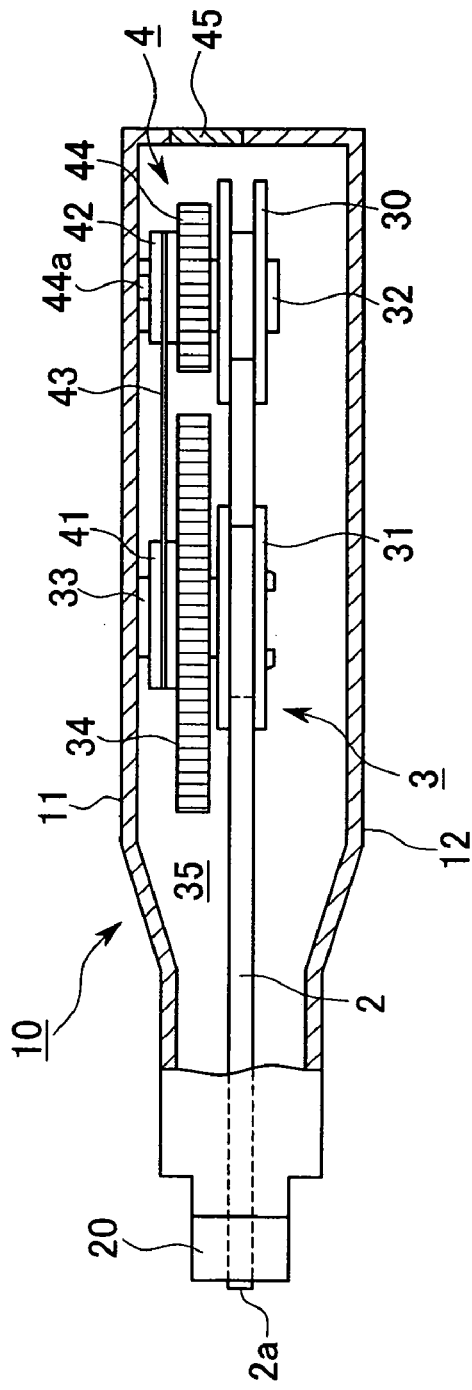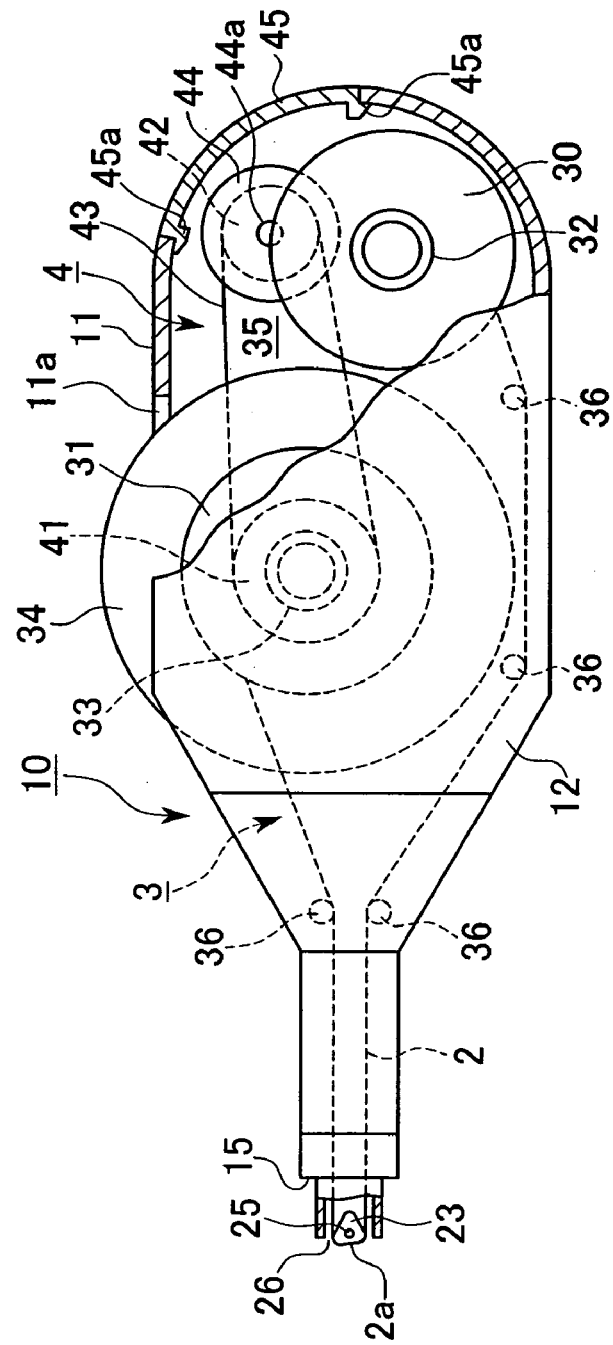
FIG. 3A
FIG. 3B

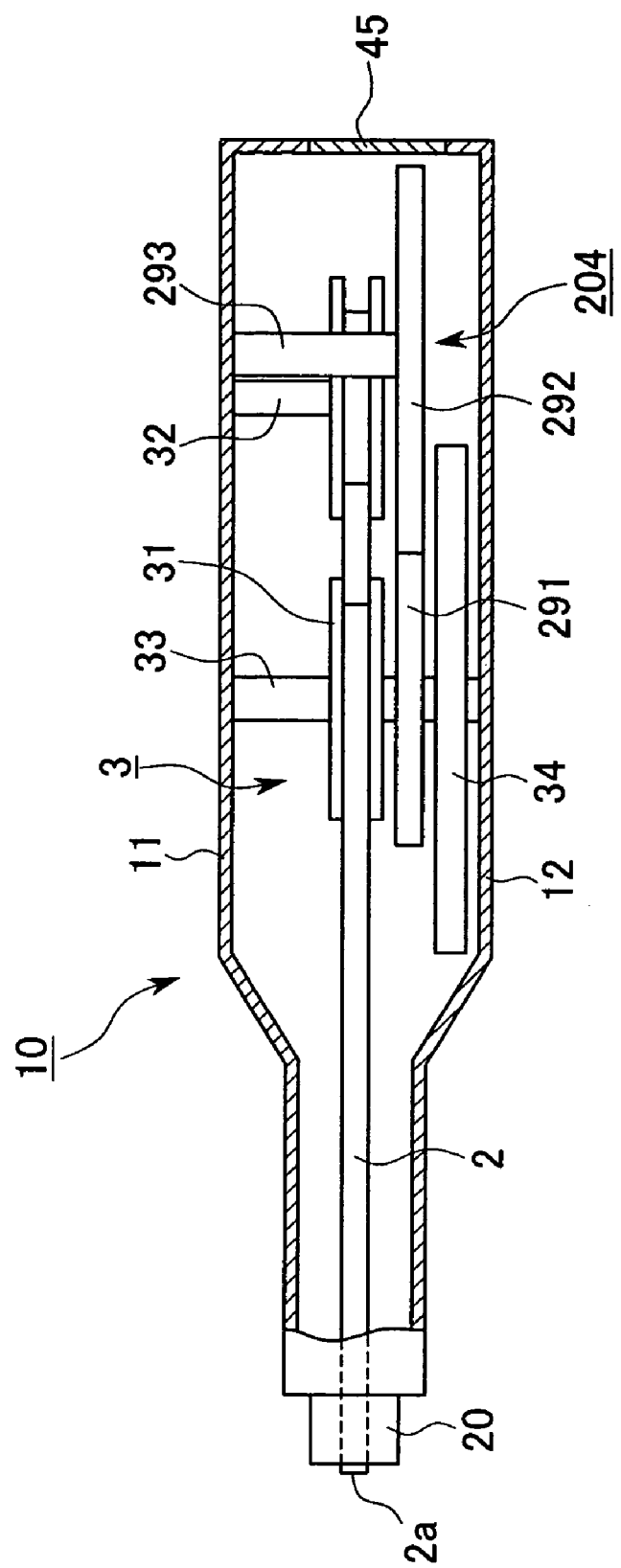

CLEANING UNIT FOR OPTICAL CONNECTOR AND CLEANING TOOL FOR OPTICAL CONNECTOR

BACKGROUND OF THE INVENTION

1. Field of the Invention

The present invention relates to a cleaning unit for optical connector and a cleaning tool for optical connector, which clean the joint side face of an optical connector in a connector housing.

2. Description of Related Art

As is widely known, in a plug-adaptor-plug connection type optical connector, optical connectors (plugs) are inserted into a connector housing to be an adaptor from opposite sides of the adaptor, and are connected inside the adaptor.

In a plug-receptacle connection type optical connector, one optical connector (a ferrule or the like) to be connected is held inside a connector housing to be a receptacle at one side thereof, and the other optical connector (plug) is inserted into the receptacle from the other side of the receptacle and connected to the one optical connector.

To connect optical connectors inside a connector housing such as an adaptor or a receptacle, the side faces of the optical fibers facing the join end faces of the optical connectors are arranged face-to-face and connected together.

If there is fouling or dust, or spot such as oil on the join end faces of the optical connectors at the time of inserting the optical connectors into the connector housing and connecting them together, this may lead to problems such as causing damage when they are inserted and removed or increasing the transmission loss; for this reason, the join end faces must be cleaned prior to connection. Conventionally, the join end faces are cleaned by using a cleaning tool such as a tape-like cleaner or a swab impregnated with alcohol, the cleaning tool being held directly by hand, touched the join end faces of the optical connectors, and wiped over the join end faces (see, for example, Japanese Unexamined Patent Application, First Publication No. 2000-284147).

When the conventional cleaning tool described above is used, in order to clean the join end faces of the optical connectors inside the connector housing, the cleaning tool must be inserted into the space (connector insertion hole) inside the connector housing for inserting the other optical connectors. Since the join end face of the optical connector to be cleaned is placed at the far end from the connector insertion hole, it is extremely hard to see, making it difficult to confirm whether the cleaning tool is properly touching the join end face and how the cleaning operation is proceeding; consequently, the cleaning may not always be successful.

Furthermore, when the cleaning tool touches the side walls of the connector housing during the cleaning operation, the cleaning tool becomes dirty, and may damage or soil the join end face if the cleaning tool directly touches the join end face in this state; for this reason, the cleaning tool must be inserted with great care, making the operation troublesome.

On the other hand, removing the optical connectors to be cleaned from the connector housing makes it easier to see and easier to touch the cleaning tool to the join end faces. However, the operation of inserting the optical connectors into the connector housing after cleaning must be performed with great care to ensure that fouling, dust, and the like, do not adhere to the optical connectors; this, combined with the time taken to insert and remove the optical connectors, makes the operation considerably more complex.

BRIEF SUMMARY OF THE INVENTION

Therefore, it is an object of the present invention to provide a cleaning unit and cleaning tool for optical connector which can easily and reliably clean the join end faces of optical connectors while they are inserted inside a connector housing.

In order to achieve the above object, the present invention provides an optical connector cleaning unit comprising a cleaning member which wipes clean a join end face of an optical connector inside a connector housing by relative motion against the join end face, a drive mechanism which drives the cleaning member, and a connection section which enables a drive auxiliary mechanism for applying a moving force to the drive mechanism to be connected.

According to the optical connector cleaning unit, the cleaning member is driven by a drive mechanism, thereby making it easier to wipe clean the join end face of the optical connector.

Furthermore, the operation of wiping clean the join end face of the optical connector is made even easier by using the moving force of the drive auxiliary mechanism to drive the cleaning member.

Furthermore, it is preferable that the optical connector cleaning unit comprises a unit main body and an insertion section, which protrudes from the unit main body and is insertable into the connector housing, wherein the cleaning member placed at the tip of the insertion section protruding from the unit main body is touched against the join side with positioning by inserting the insertion section into the connector housing.

According to the above optical connector cleaning unit, the cleaning member is accurately touched the join end face of the optical connector inside the connector housing merely by inserting the insertion section into the connector housing. At the time of inserting the cleaning member into the connector housing, the cleaning member is prevented from touching the inner walls of the connector housing. Therefore, the cleaning member is prevented from contaminating. Moreover, when the join end face is wiped clean by operating the cleaning member, the cleaning member is easily maintained in an appropriate position where the cleaning member is touched against the join end face, enabling the join end face to be cleaned more reliably and easily. Even if the cleaning tool is held manually, the cleaning member is unlikely to suffer positional deviation resulting from movement of the hands. Since the insertion section can be supported inside the connector housing with a very light force, workability is good.

Furthermore, the present invention provides an optical connector cleaning tool in which a drive auxiliary unit comprising the drive auxiliary mechanism is connected to the connection section of the optical connector cleaning unit.

According to the above optical connector cleaning tool, since the cleaning member can be driven by the moving force from the drive auxiliary mechanism, it becomes easier to wipe clean the join end face of the optical connector. By disconnecting the connection section and replacing the optical connector cleaning unit, the cleaning member can easily be replaced.

Preferably, the drive auxiliary unit comprises a grip section for gripping the optical connector cleaning tool, and it is possible to change the angle of the optical connector cleaning unit with respect to the grip section to multiple alternative angles.

According to the above optical connector cleaning tool, cleaning can be performed easily even if the optical connector and the connector housing are located in comparatively narrow, high, or low places.

BRIEF DESCRIPTION OF THE DRAWINGS

FIG. 3A is a cross-sectional view from above the cleaning unit of the first embodiment.

FIG. 3B is a partially cutaway cross-sectional view from the front of the cleaning unit of the first embodiment.

FIG. 11 is a cross-sectional view from above the cleaning unit of FIG. 9.

DETAILED DESCRIPTION OF THE INVENTION

The present invention will be explained based on the following embodiments.

FIGS. 1 to 7 show an embodiment of the cleaning tool for optical connector (hereinafter abbreviated as "cleaning tool") according to the present invention.

Figure 1:
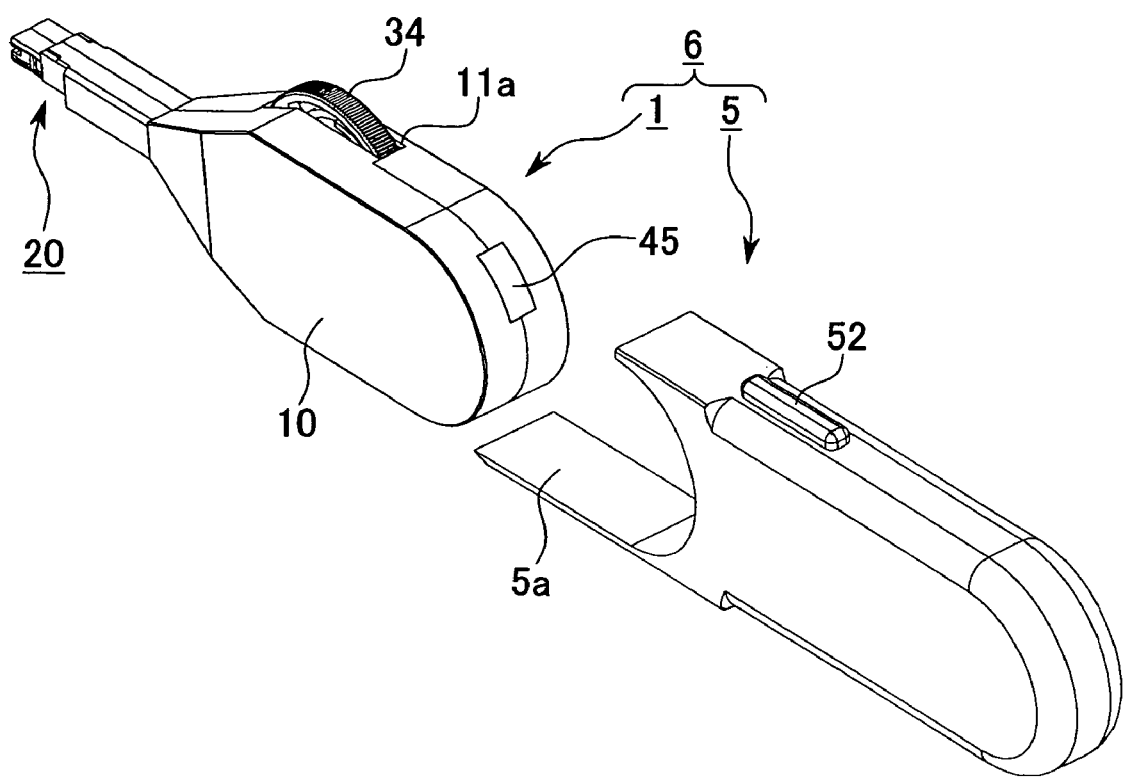
FIG. 1 is a perspective view of a cleaning unit and a drive auxiliary unit in a first embodiment of the cleaning tool of the present invention.
Figure 2A:
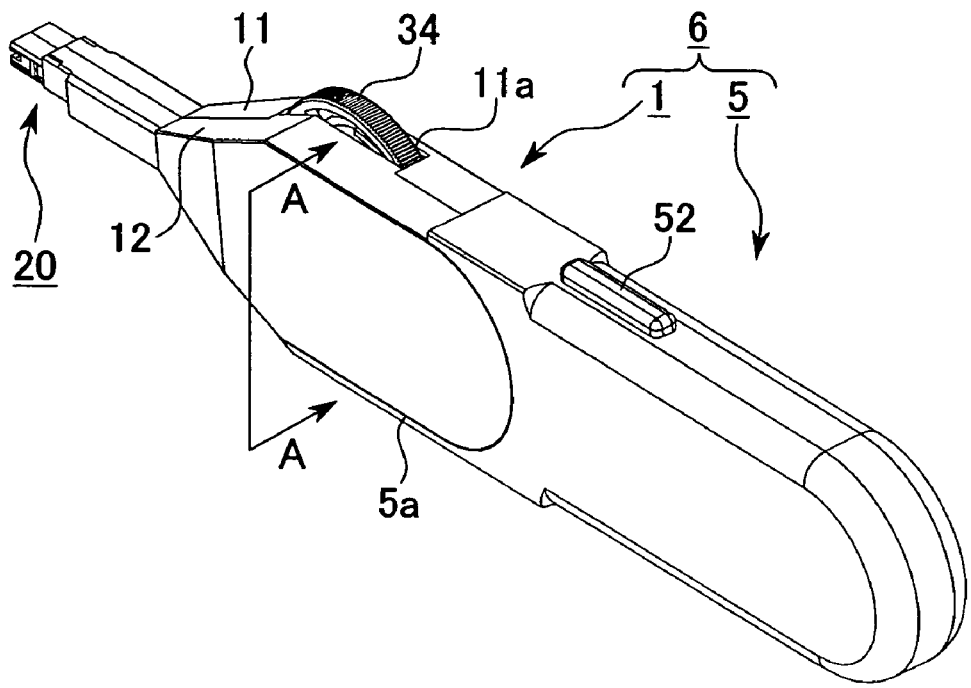
FIG. 2A is a perspective view of the cleaning tool of the first embodiment.
Figure 2B:
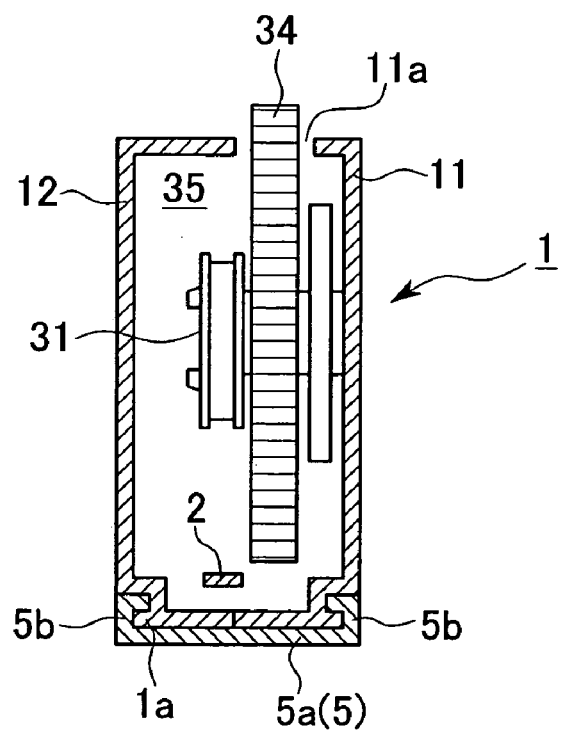
FIG. 2B is a horizontal cross-sectional view taken along the line A—A of FIG. 2A.

As shown in FIGS. 1, 2A, and 2B, a cleaning tool 6 comprises, as will be explained in more detail below, a drive auxiliary unit 5, which can be connected to an optical connector cleaning unit 1 (hereinafter abbreviated as "cleaning unit") for cleaning the join end face of an optical connector (plug).

There are no particular restrictions on the specific constitution for connecting a cleaning unit 1 and drive auxiliary unit 5; for example, as shown in FIG. 2B, cleaning unit 1 and drive auxiliary unit 5 are connected by engaging engagement members 5b on both sides of a front edge section 5a of drive auxiliary unit 5 and engagement members 1a on the bottom edges of cleaning unit 1.

Figure 6:
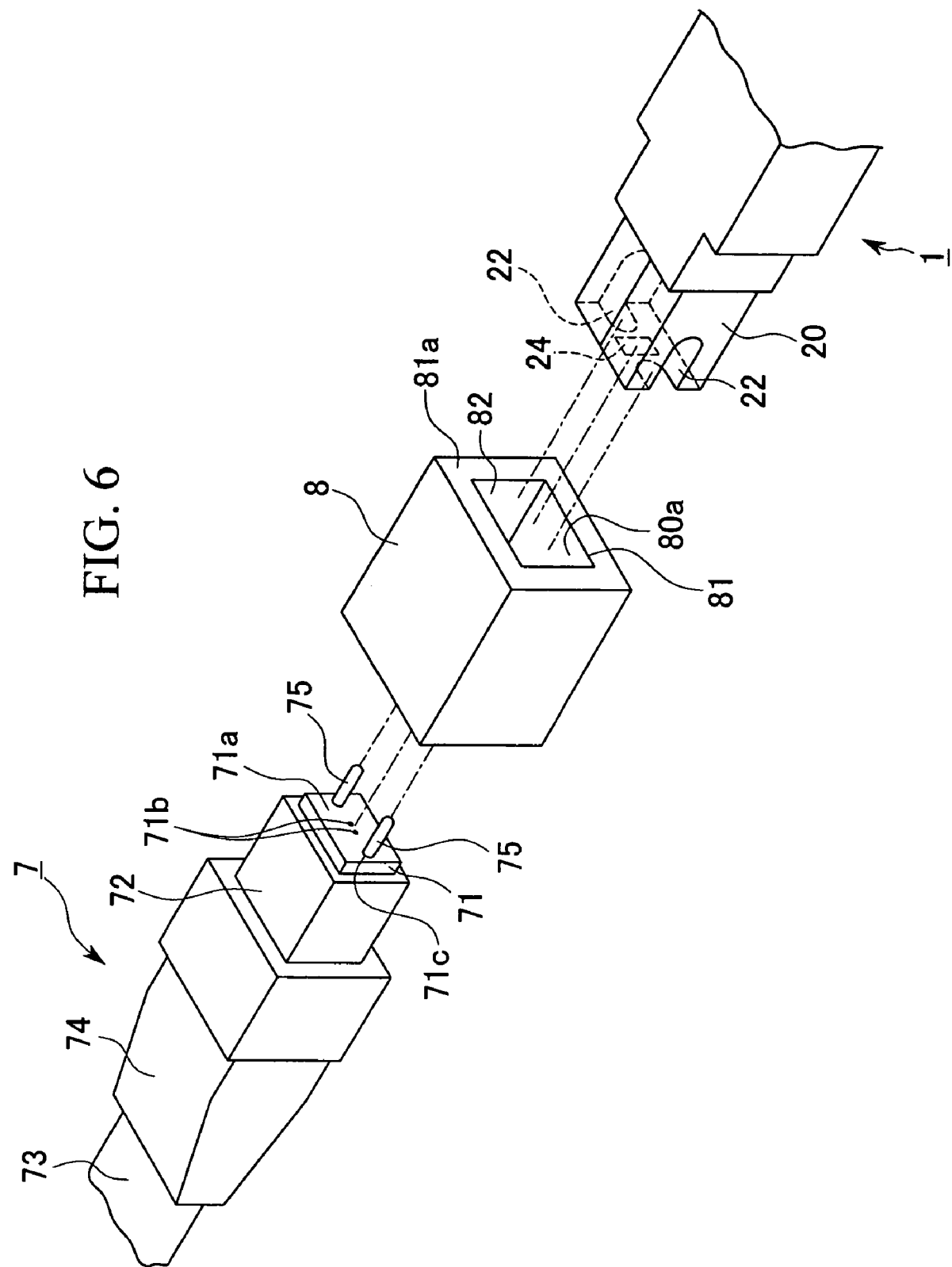
FIG. 6 is an exploded perspective view of the insertion section of the cleaning unit of the first embodiment being inserted into an adaptor containing an optical connector.
Figure 7:
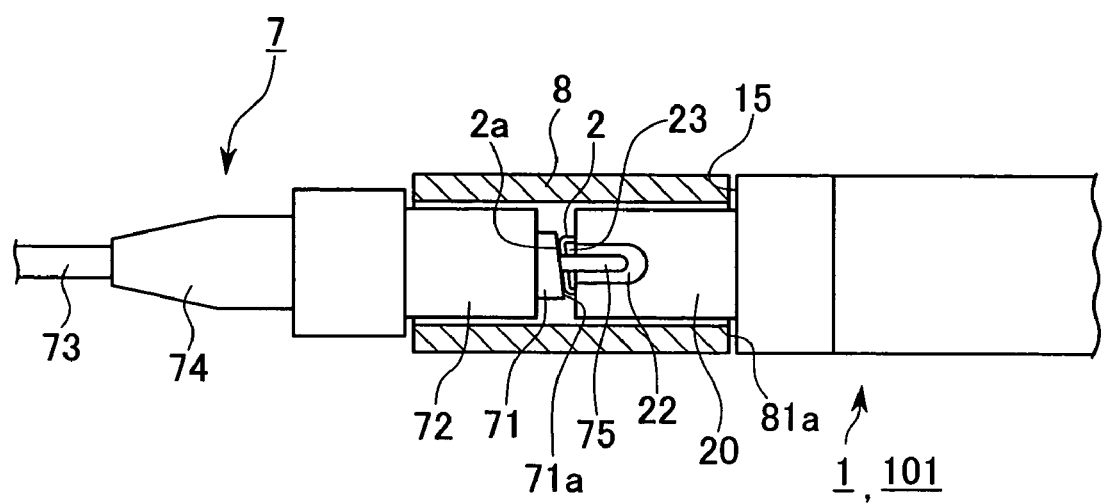
FIG. 7 is a cross-sectional perspective view of the insertion section of the cleaning unit of the first embodiment when it has been inserted into an adaptor containing an optical connector.
Figure 8:
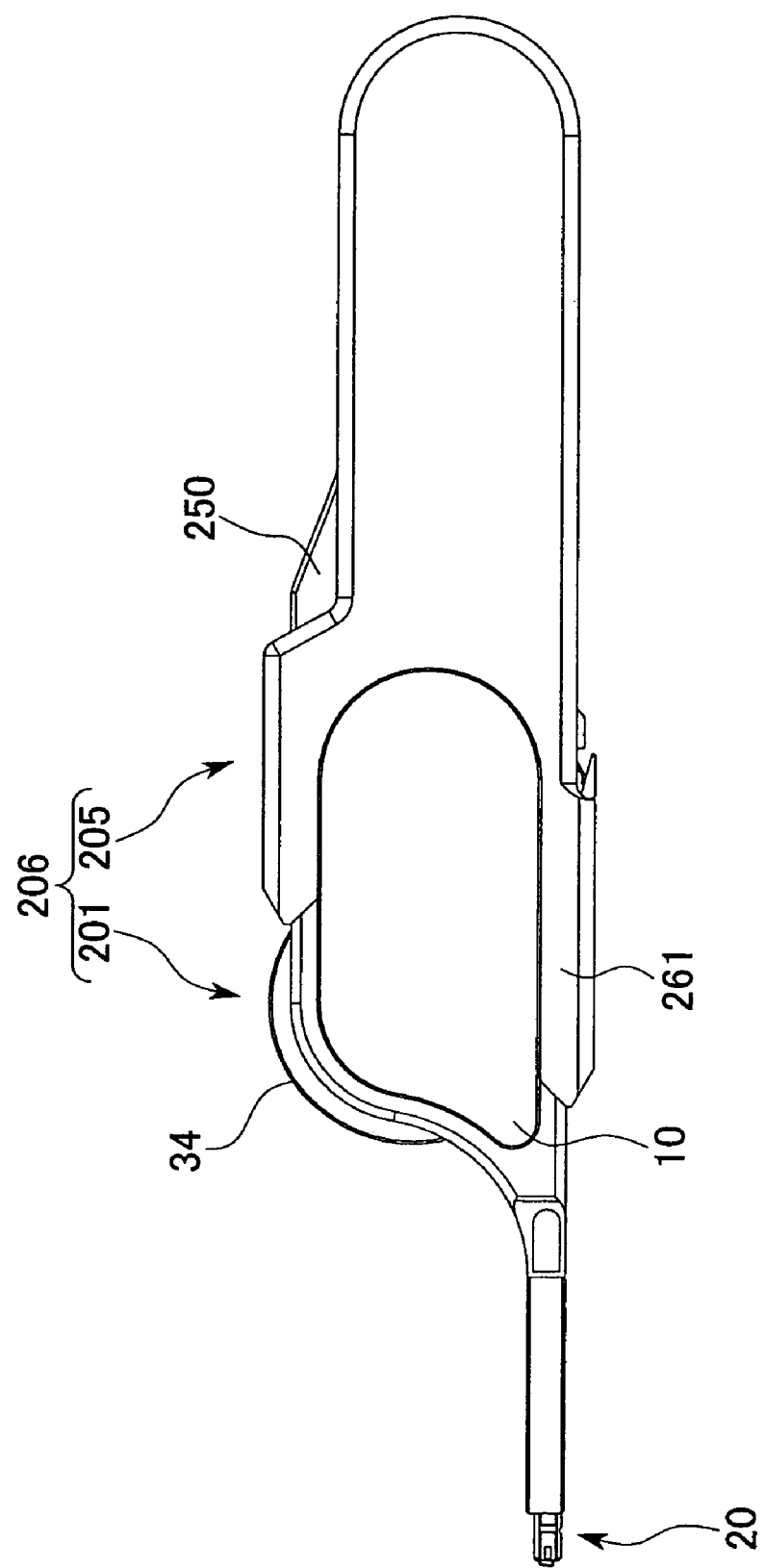
FIG. 8 is a front view of a second embodiment of the cleaning tool of the present invention.

As shown in FIGS. 6 and 7, the optical connector (plug) and the connector housing (adaptor), in which cleaning unit 1 and cleaning tool 6 of this embodiment are applied, comprise an MPO (multifiber push on) optical connector defined in Japanese Industrial Standard (JIS) C 5982.

An optical connector 7 is an optical connector (plug) comprising an MT optical connector ferrule 71 (MT=mechanically transferable; hereinafter simply "ferrule"), defined in JIS C 5981 and the like, which is provided inside the tip section of a plastic sleeve-like housing 72, and its outer appearance is flat in cross-section.

In the following explanation, the direction corresponding to the short side of the flat shape of optical connector 7 (the vertical direction in FIG. 7) may be referred to as the "thickness direction", and the direction corresponding to the long side (the direction perpendicular to the paper face in FIG. 7) may be referred to as the "width direction". Similarly, in a connector housing 8 which is connected to optical connector 7, and an insertion section 20 of the cleaning unit which is inserted into a connector housing 8, their directions may be referred to as the "thickness direction" and "width direction" which correspond to the thickness direction and width direction of optical connector 7.

A predetermined number of optical fiber holes 71b are provided in a join end face 71a of ferrule 71. Optical fibers 73 are formed by inserting the tips thereof through optical fiber holes 71b (micropores) so that optical fibers 73 can be push-connected to another optical connector, and pass through the internal section of optical connector 7 and are extracted at the rear side of optical connector 7.

Optical fibers 73 extracted from the rear side of optical connector 7 are accommodated in a booth 74, provided at the rear end side of the connected direction of housing 72 (at the left side of FIG. 7), thereby preventing sudden bending and the like near the rear end of optical connector 7.

There are no particular restrictions on optical fiber 73, which can comprise, for example, a single-core or multicore type optical fiber core, an optical fiber cord in which the optical fiber core is provided in a tube, or the like. When using the optical fiber core or the optical fiber cord, a bare optical fiber exposed by removing the coating of the tip of the optical fiber core or the like is inserted into optical fiber hole 71b of ferrule 71, enabling it to be push-connected.

Guide pin holes 71c are provided in join end face 71a of ferrule 71 on both sides of the region where optical fiber holes 71b are provided. Ferrules 71 are positioned with high precision by means of a conventional guide pin fitting mechanism using protruding members 75 (guide pins), which are inserted into guide pin holes 71c and protrude from join end face 71a, join end faces 71a of ferrules 71 being push-connected together, thereby optically connecting optical fibers 73 at the tips of ferrules 71.

Adaptor 8 is approximately sleeve-like in shape, and optical connector 7 can be inserted via a connector insertion hole 81, provided in opposite sides of adaptor 8, and accommodated in a connector accommodation hole 82 inside adaptor 8.

Optical connector 7 is inserted through connector insertion hole 81 of connector housing 8, and is accommodated inside connector accommodation hole 82 while being restricted from deviating from the insertion direction. When two optical connectors 7 are inserted into adaptor 8, ferrules 71 are push-connected together inside adaptor 8, optically connecting optical fibers 73 at the tips of ferrules 71.

As shown in more detail in FIGS. 3A and 3B, cleaning unit 1 which can be applied in cleaning join end face 71a of connector 7 comprises a unit main body 10, which is approximately case-like in shape and accommodates a cleaning member 2, an insertion section 20 which protrudes from unit main body 10 and can be inserted into connector accommodation hole 82 of connector housing 8, a drive mechanism 3 which drives cleaning member 2, and a connection section 4 for connecting a drive auxiliary mechanism (explained later) which gives driving force to drive mechanism 3.

Unit main body 10 has a two-part structure comprising first and second case half-bodies 11 and 12, which are made of plastic and the like. Although not illustrated here, these can be connected into a single piece by, for example, fitting a fitting pin, protruding from the inner side of the first case half-body 11, into a fitted hole, provided in a boss protruding from the inner side of the second case half-body 12.

The shape of unit main body 10 is tapered toward insertion section 20.

In this example, cleaning member 2 is a tape. There are no restrictions on a tape 2, which may comprise a conventional cleaning fabric (of woven or non-woven fabric) which is formed into a tape; for example, an extra fine denier fiber such as polyester or nylon is appropriate.

Tape 2 is wide enough to wipe the side faces of all the optical fibers exposed at join end face 71a of optical connector 7, and the surrounding areas.

A tape feeding mechanism for feeding the tape 2 is provided in storage space 35 between case half-bodies 11 and 12 as drive mechanism 3.

Tape feeding mechanism 3 is equipped with a supply reel 30 around which tape 2 is wound, a take-up reel 31 which reels up tape 2 which is used, and a control dial 34 which operates tape 2.

Supply reel 30 is rotatably supported by a supply reel supporting shaft 32, and take-up reel 31 is rotatably supported by a take-up reel supporting shaft 33; supporting shafts 32 and 33 are provided on the inside face of the first case half-body 11 (the side facing the storage space 35).

Control dial 34 is attached around the outer periphery of take-up reel supporting shaft 33, so that it is concentric with take-up reel 31.

A part of control dial 34 is exposed to the outside of unit main body 10 via a window 11a provided in the side face of the first case half-body 11. When control dial 34 is manually rotated in a predetermined direction, take-up reel 31 rotates and reels tape 2, and unused tape 2 is unwound from supply reel 30. Since window 11a is provided in the side face of unit main body 10, even if cleaning unit 1 is held in one hand, control dial 34 can easily be operated by the fingers of the same hand.

The radius of control dial 34 is greater than the radius of take-up reel 31. As a result, the length of tape 2 when it is wound around take-up reel 31 is shorter than the amount of operation of control dial 34 (the amount of displacement along the outer periphery of control dial 34) by a distance equivalent to the ratio between the radii. Therefore, a very small amount of tape 2 can be easily fed.

Between supply reel 30 and take-up reel 31, tape 2 is stretched along a pin-shaped tape guide 36 in storage space 35 provided between case half-bodies 11 and 12. On the way from supply reel 30 and take-up reel 31, tape 2 is wound around a head member 23 (which will be explained later), which is accommodated in insertion section 20.

Tape feeding mechanism 3 can be driven by manually operating control dial 34. Furthermore, tape feeding mechanism 3 can be driven by connecting a power source comprising drive auxiliary unit 5 to cleaning unit 1 via connection section 4.

Drive auxiliary unit 5 comprises a drive auxiliary mechanism 50 which applies a driving force to tape feeding mechanism 3. One example of the specific constitution of drive auxiliary mechanism 50 would be that incorporated in a drive auxiliary unit 205, described later in a second embodiment.

As shown in FIGS. 3A and 3B, connection section 4 is, in detail, composed of a gear 44, which is supported by a shaft 44a, belt wheels 41 and 42, which are attached around the outer peripheries of take-up reel supporting shaft 33 and shaft 44a, and a belt 43, which is wound around belt wheels 41 and 42. When gear 44 rotates, its rotational force is transmitted by the rotation of belt wheels 41 and 42 via belt 43 to take-up reel supporting shaft 33, thereby driving tape feeding mechanism 3.

Figure 4:
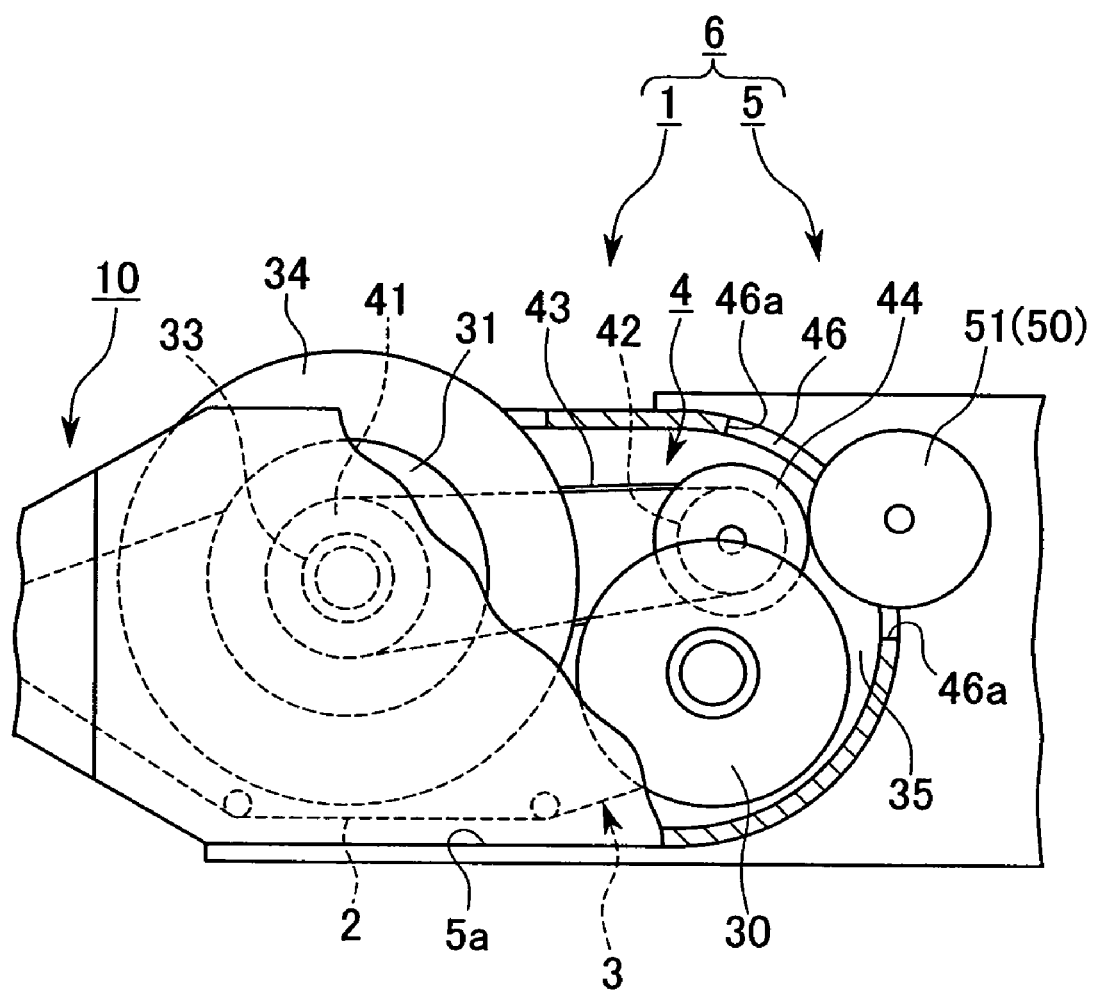
FIG. 4 is a partially cutaway cross-sectional view showing one example of a connection between a connection section and a drive auxiliary mechanism in the cleaning tool of the first embodiment.

As shown in FIGS. 3 and 4, an opening 46 is provided in the rear edge section of unit main body 10. Opening 46 is closed by engaging a clipping projection 45a of a lid 45 to an edge 46a of opening 46.

With lid 45 removed, fitting the front edge section of drive auxiliary unit 5 to the rear edge section of unit main body 10 enables a gear 51 of drive auxiliary mechanism 50, which is incorporated in drive auxiliary unit 5, to mesh with gear 44 of connection section 4. An unillustrated power source, such as an electric motor, drives gear 51, and, when gears 44 and 51 are meshed, the driving force from the power source is transmitted via connection section 4 to tape feeding mechanism 3, feeding tape 2.

The power source is switched on and off by a drive switch 52 shown in FIGS. 1 and 2.

Incidentally, a rubber, a power spring, or the like, can be used as the power source instead of an electric motor.

Cleaning unit 1 further comprises insertion section 20, which protrudes from unit main body 10 and is insertable into the connector housing.

By inserting insertion section 20 into connector housing 8, cleaning member 2 (tape), placed on the tip of insertion section 20 which protrudes from unit main body 10, can be touched join end face 71a of optical connector 7 with positioning.

Figure 5A:
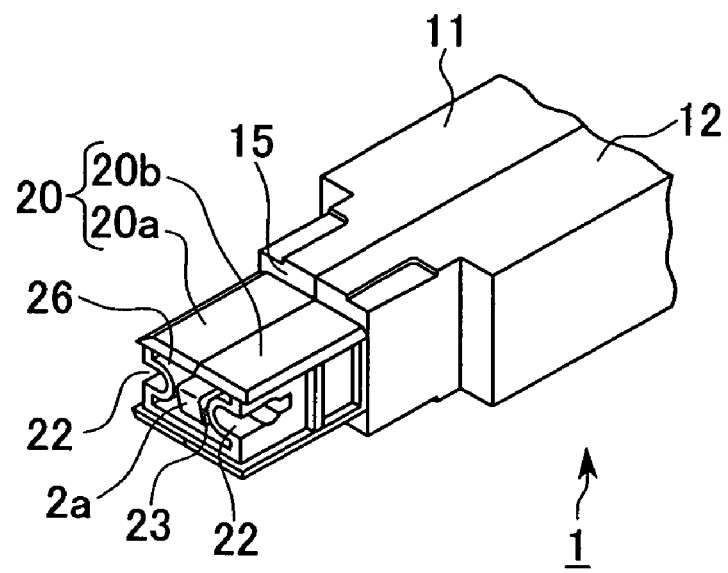
FIG. 5A is a perspective view of an insertion section in the cleaning unit of the first embodiment.
Figure 5B:
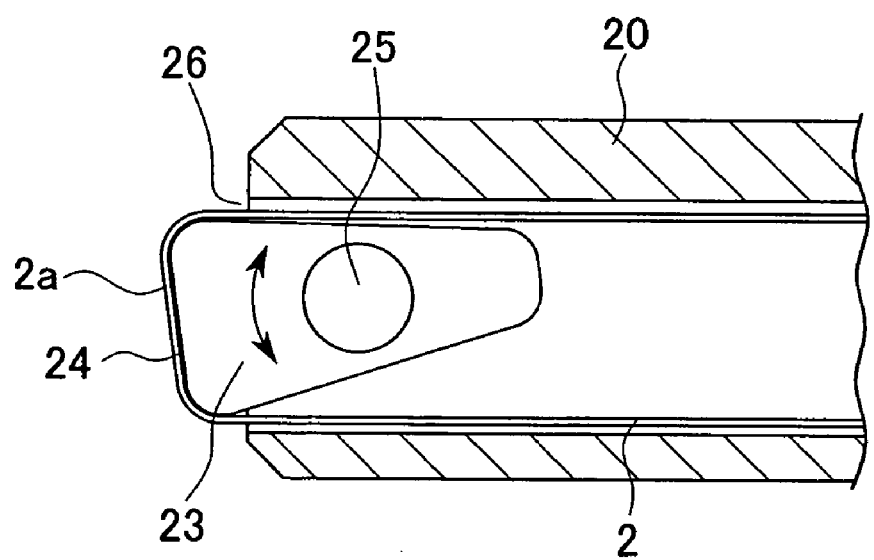
FIG. 5B is a vertical cross-sectional view of the insertion section in the cleaning unit of the first embodiment.

More specifically, as shown in FIG. 5A, insertion section 20 has the same two-part structure as unit main body 10, and comprises insertion section half-bodies 20a and 20b, which are connected in single pieces to case half-bodies 11 and 12, insertion section half-bodies 20a and 20b being connected together into a single piece when case half-bodies 11 and 12 are connected together. Concave sections 22 are provided on both sides of the outer face of insertion section 20 parallel to its width, and prevent interference with protruding members (guide pins) 75, which protrude from join end face 71a of optical connector 7.

In other words, concave sections 22 prevent interference with protruding members 75, which protrude join end face 71a, at the time of inserting insertion section 20 into connector housing 8.

Head member 23 to be wound round with tape 2 is accommodated in insertion section 20. As shown in the plane view of FIG. 5B, the shape of head member 23 in the insertion direction of insertion section 20 is between an elongated triangular and a trapezoid, and the tip side in the insertion direction (the left side of FIG. 5B) forms a direct-contact face 24. Head member 23 is supported by supporting shaft 25 provided between insertion section half-bodies 20a and 20b so as to rotate upwards and downwards around supporting shaft 25 to be changed the direction according to the insertion direction of insertion section 20 of direct-contact face 24.

This makes it possible to change the direction of direct-contact section 2a of cleaning member 2, which directly contacts join end face 71a, according to the insertion direction of insertion section 20 of direct-contact face 24.

Direct-contact face 24 at the tip of head member 23 is larger in the direction of its width than the part of direct-contact face 24 accommodated in insertion section 20. Since direct-contact face 24 directly contacts join end face 41a of optical connector 7, a sufficient size for direct-contact face 24 of head member 23 to directly contact join end face 71a of optical connector 7 is ensured, while preventing tape 2 from being pushed against the inner walls of insertion section 20 when head member 23 is rotated around supporting shaft 25.

An opening 26 is provided at the tip of insertion section 20. Direct-contact face 24 of head member 23 and tape 2, which is wound along direct-contact face 24, are exposed through opening 26.

A cap, a cover, and the like, may of course be fitted to the tip of insertion section 20 to protect head member 23 and tape 2 when they are exposed through opening 26, though these are not illustrated in the diagrams.

A step 15 is provided in unit main body 10 side of insertion section 20. Step 15 directly contacts peripheral edge 81a of connector insertion hole 81 of adapter 8, and thereby prevents insertion section 20 from being inserted too deeply into connector accommodation hole 82.

An example of a method for using cleaning unit 1 and cleaning tool 6 will be explained.

When insertion section 20 of cleaning tool 6 is inserted through connector insertion hole 81 of adapter 8, outer faces of insertion section 20 are positioned by the side walls 80a of adapter 8 as it proceeds into connector accommodation hole 82. By pushing insertion section 20 until step 15 touches the peripheral edge of connector insertion hole 81, cleaning member 2 is positioned so as to directly contact an appropriate position (in this case, optical fiber holes 71b and the surrounding area) on join end face 71a of optical connector 7.

The reaction when direct-contact face 24 directly contacts join end face 71a of optical connector 7 causes head member 23 to rotate around supporting shaft 25, so that, even if join end face 71a was tilted with respect to the insertion direction of insertion section 20, direct-contact section 2a of tape 2, which directly contacts join end face 71a, can be exactly aligned.

Even if guide pins 75 protrudes from join end face 71a of optical connector 7, they are accommodated into concave sections 22 of insertion section 20, enabling insertion section 20 to be accommodated into connector accommodation hole 82 without interfering with guide pins 75.

When control dial 34 is rotated by a predetermined amount, tape 2 moves as a result of the rotation of take-up reel 31 and wipes join end face 71a, reliably removing fouling, dust, or oil therefrom.

During cleaning, with insertion section 20 positioned in connector accommodation hole 82 of adapter 8, direct-contact section 2a of tape 2 can wipe join end face 71a clean with a uniform pushing force without positional deviation. Insertion section 20 can be supported in adapter 8 by an extremely light force, improving workability.

Guide pins 75 are accommodated in concave sections 22, isolated from tape 2, and consequently, the interference between tape 2 and protruding members 75 is prevented.

Since the fouling, which has been wiped off, adheres to tape 2 and moves in the same direction toward take-up reel 31, tape 2 is not exposed through opening 26 in insertion section 20 after use, and consequently there is no danger that the fouling will adhere to join end face 71a again.

Therefore, join end face 71a can be cleaned very thoroughly.

After cleaning, insertion section 20 can be easily removed by pulling it out in the opposite direction to that when cleaning unit 1 was inserted.

When drive auxiliary unit 5 has been attached to cleaning unit 1, tape 2 can be moved by the driving force of drive auxiliary unit 5. Furthermore, when a great number of cleaning units 1 are used for one drive auxiliary unit 5, each cleaning unit 1 being replaced after its tape 2 has been completely used up, there is no need to open cleaning unit 1 on site and replace tape 2. This achieves extremely high workability.

FIGS. 8 to 18 show a second embodiment of the cleaning unit and cleaning tool of the present invention. The same reference numerals as those used in FIGS. 1 to 7 represent the same or similar parts, and are not explained again.

A cleaning tool 206 of the present embodiment is an example of a modification of cleaning tool 6 of the first embodiment, and, as in the first embodiment, comprises a cleaning unit 201 and a drive auxiliary unit 205 which can be connected to cleaning unit 201.

Figure 9A:
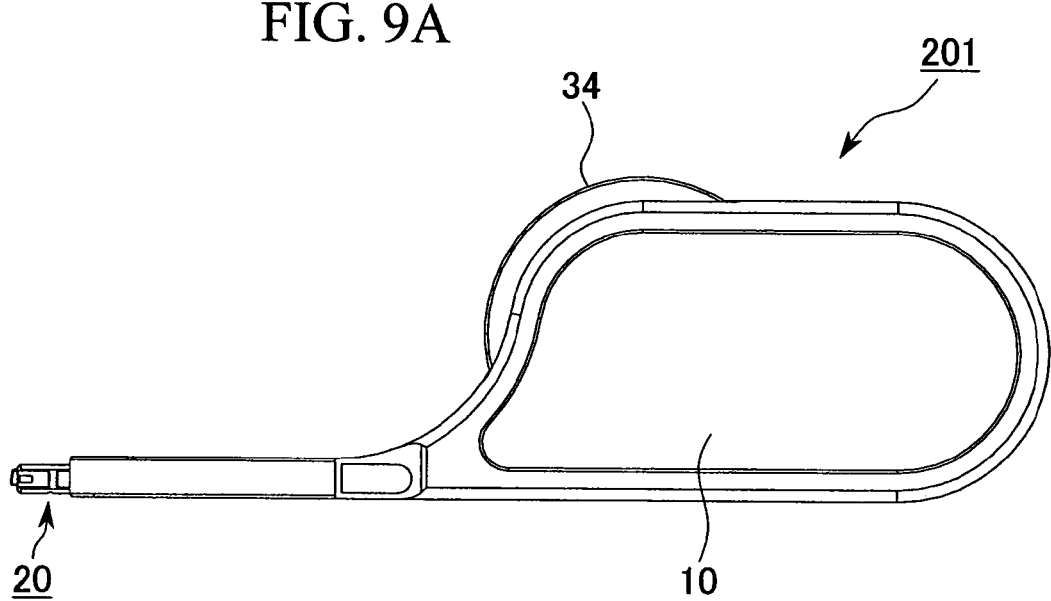
FIG. 9A is a front view of a cleaning unit according to the cleaning tool of the second embodiment.
Figure 9B:
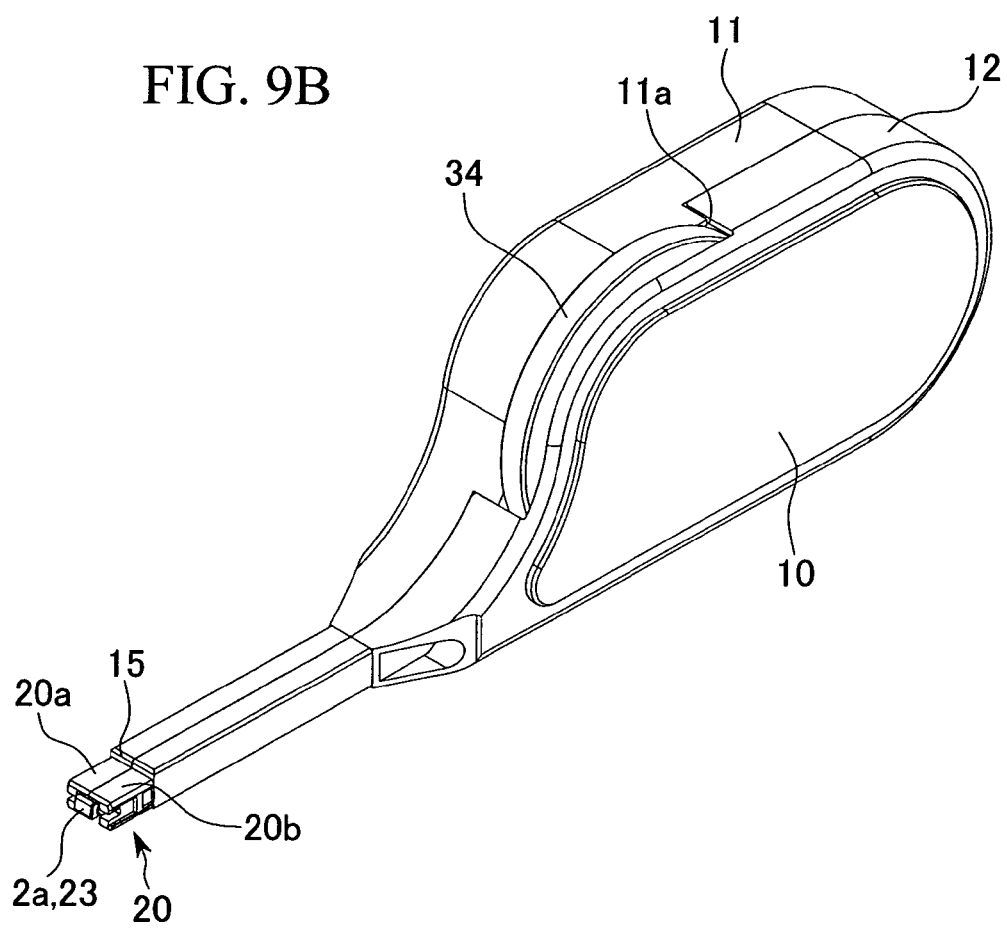
FIG. 9B is a perspective view of the cleaning unit according to the cleaning tool of the second embodiment.
Figure 10:
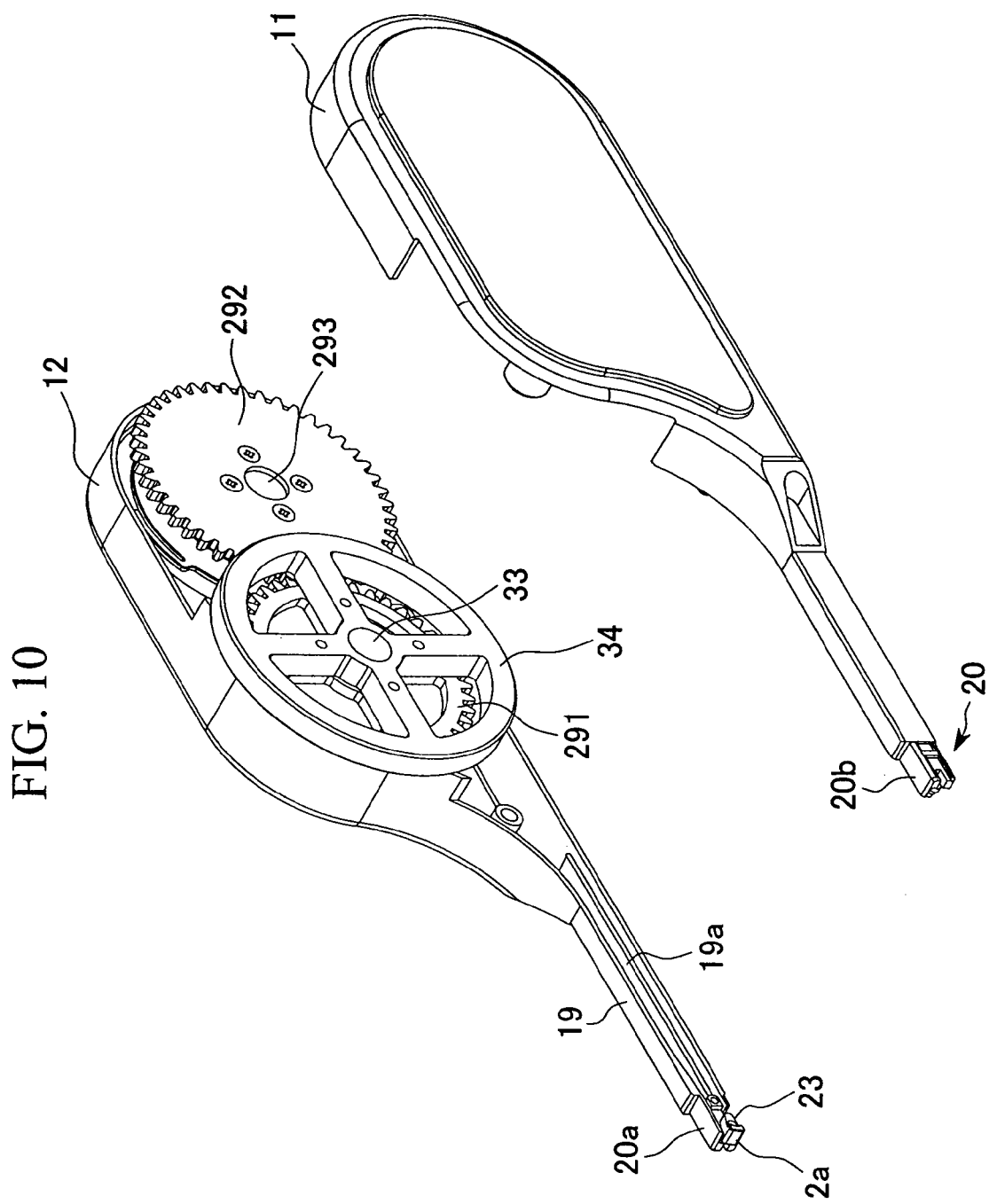
FIG. 10 is an exploded perspective view of the cleaning unit of FIG. 9.
Figure 12A:
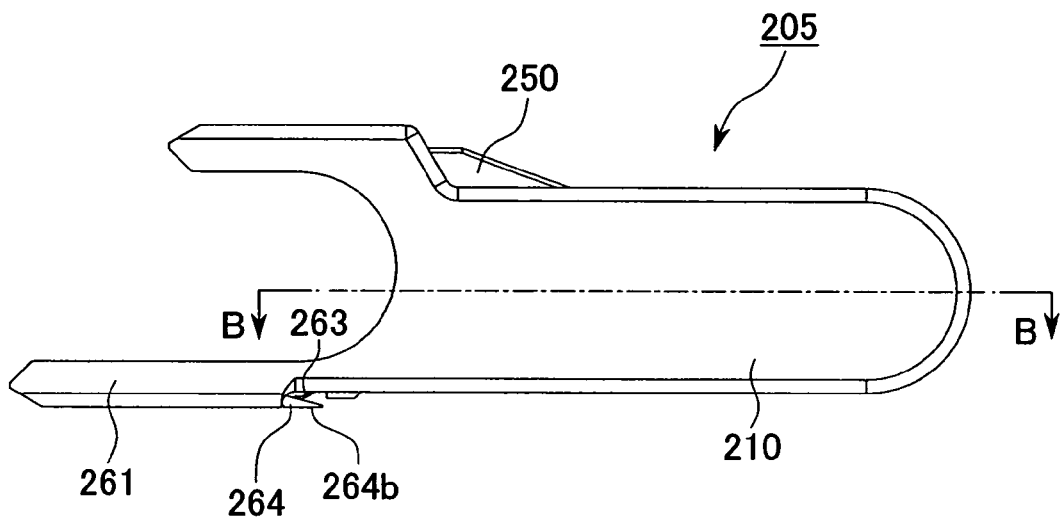
FIG. 12A is a front view of the drive auxiliary unit according to the cleaning tool of the second embodiment.
Figure 12B:
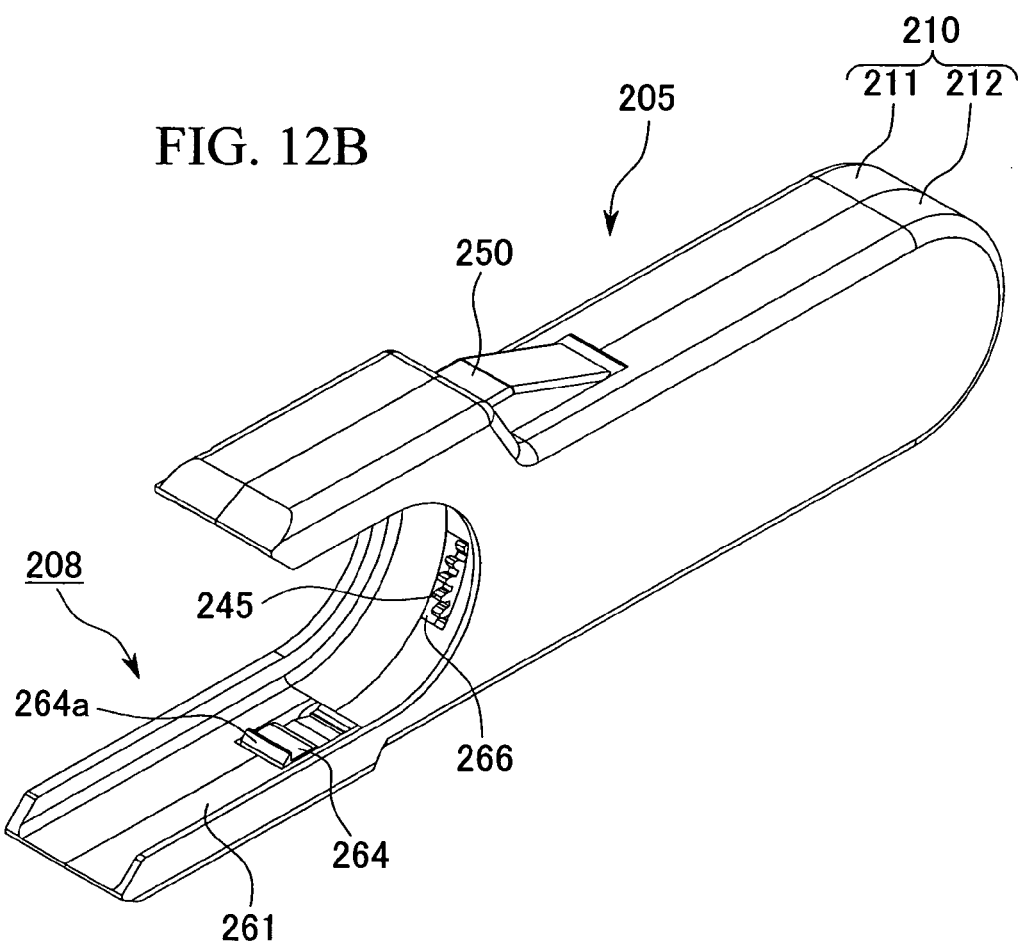
FIG. 12B is a perspective view of the drive auxiliary unit according to the cleaning tool of the second embodiment.
Figure 13:
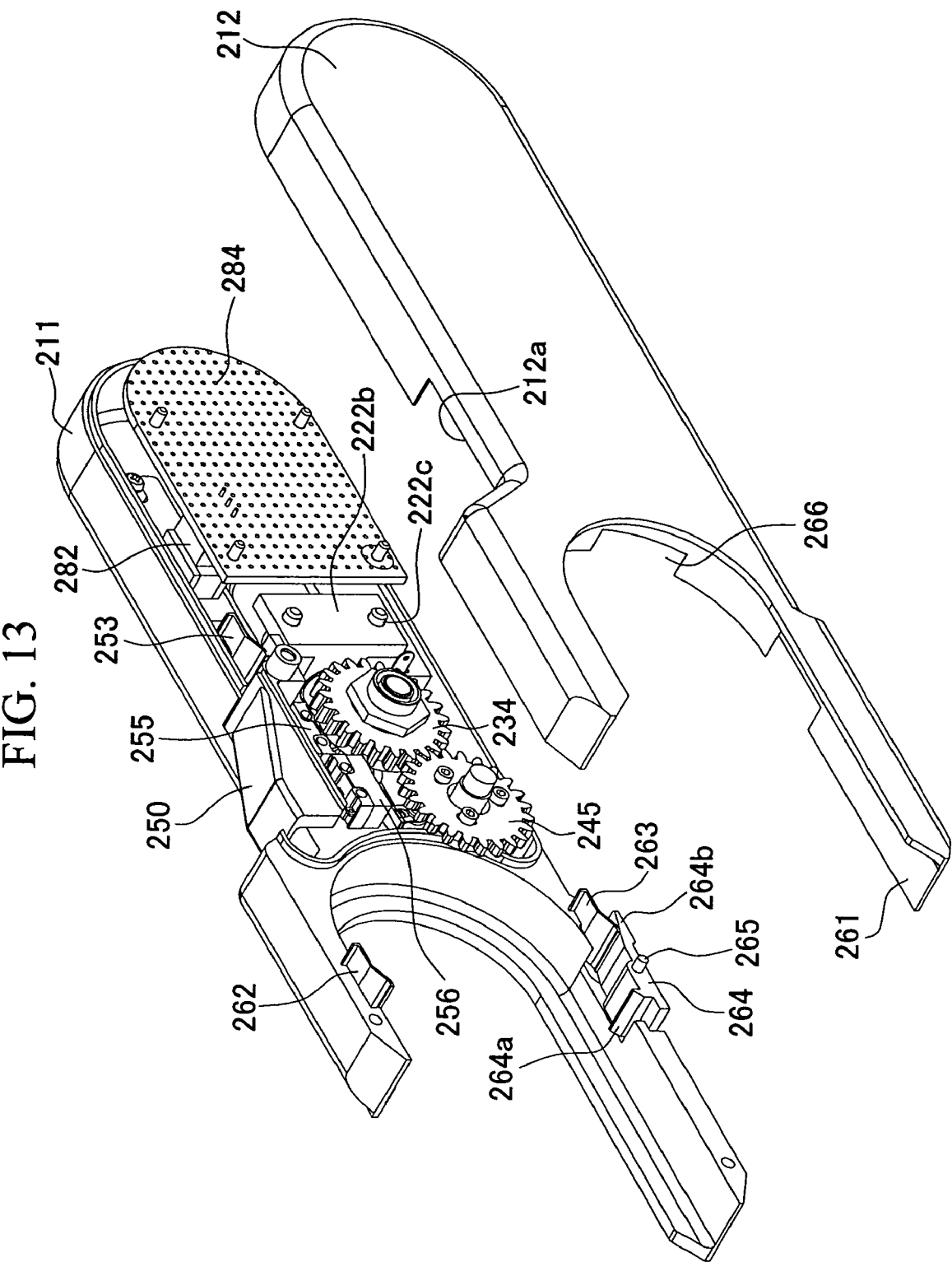
FIG. 13 is an exploded perspective view (No. 1) of the drive auxiliary unit of FIGS. 12A and 12B.

As shown in FIGS. 9 to 11, cleaning unit 201 of the present embodiment comprises unit main body 10, which has a case-like shape and accommodates cleaning member 2, insertion section 20 which protrudes from cleaning unit 10 and can be inserted into connector accommodation hole 82 of adapter 8, drive mechanism 3 which drives cleaning member 2, and a connection section 204 for connecting a drive auxiliary mechanism (explained later) which powers drive mechanism 3.

Connection section 204 comprises a gear 291, attached to the outer periphery of take-up reel supporting shaft 33, and a gear 292, attached to the outer periphery of a shaft 293, which is connected to case half-body 11. Gears 291 and 292 are meshed. As in the first embodiment, when cleaning unit 201 and drive auxiliary unit 205 are connected together and a gear 245 (see FIG. 12) of drive auxiliary unit 205 meshes with gear 292, gear 292 is driven by drive auxiliary unit 205, the rotational force of gear 292 being transmitted via gear 291 to take-up reel supporting shaft 33, tape feeding mechanism 3.

In cleaning unit 201, a section 19 of unit main body 10 which is near insertion section 20 is narrow, and has a protruding wall 19a for reinforcing a narrow section 19. Protruding wall 19a restricts the movement of the fouling on cleaning tape 2 by separating the path of cleaning tape 2 to be clean, which travels from supply reel 30 toward head member 23, from the path of cleaning tape 2 to be fouled which travels from head member 23 to take-up reel 31.

As shown in detail in FIGS. 12 to 16, drive auxiliary unit 205 has a drive auxiliary mechanism 207, accommodated in a case 210, and a connection mechanism 208, which is provided at the front edge of case 210 and enables cleaning unit 201 to be connected to drive auxiliary unit 205.

Case 210 has a two-part structure comprising first and second case half-bodies 211 and 212, which are made of plastic or the like; case 210 can be arranged into a single piece by facing case half-bodies 211 and 212 toward each other, fitting their peripheral edges together, and, for example, screwing them with screws 213 and 214.

An open section 266 is provided at the front edge side of case 210 (the left side of FIG. 13) for exposing some of the teeth of a gear 245 of drive auxiliary mechanism 207 to the outside of case 210.

Notches 221a and 212a are provided in the top of case half-bodies 211 and 212, and function as a window 210a for exposing a control switch 250 (explained later) to the outside of case 210 when case 210 is assembled.

Connection mechanism 208 has a pair of pressing members comprising a plate spring 262 on the top of the front end of case 210, and a lever-like clipping member 264 which faces plate spring 262 at the bottom of the front end of case 210.

The front edge of clipping member 264 is a clipping section 264a, and the rear edge is a control section 264b. Clipping member 264 is fitted between case half-bodies 211 and 212 by a shaft 265 leading to the central section between clipping section 264a and control section 264b.

When clipping section 264a is pressed toward the bottom face of case 210, clipping section 264a separates from plate spring 262 so that clipping member 264 opens. Clipping member 264 is held in place by a plate spring 263 which directly contacts the bottom face side of control section 264b, and, when the controlling force to control section 264b is released, clipping section 264a side of clipping member 264 approaches plate spring 262 so that clipping member 264 closes.

By operating control section 264b of clipping member 264, opening up a space between plate spring 262 as a pressing member and clipping member 264, and releasing the controlling force to control section 264b after fitting cleaning unit 201 to front edge 261 of case 210, connection section 208 presses against the rear section of cleaning unit 201 and holds it in place.

Figure 15:
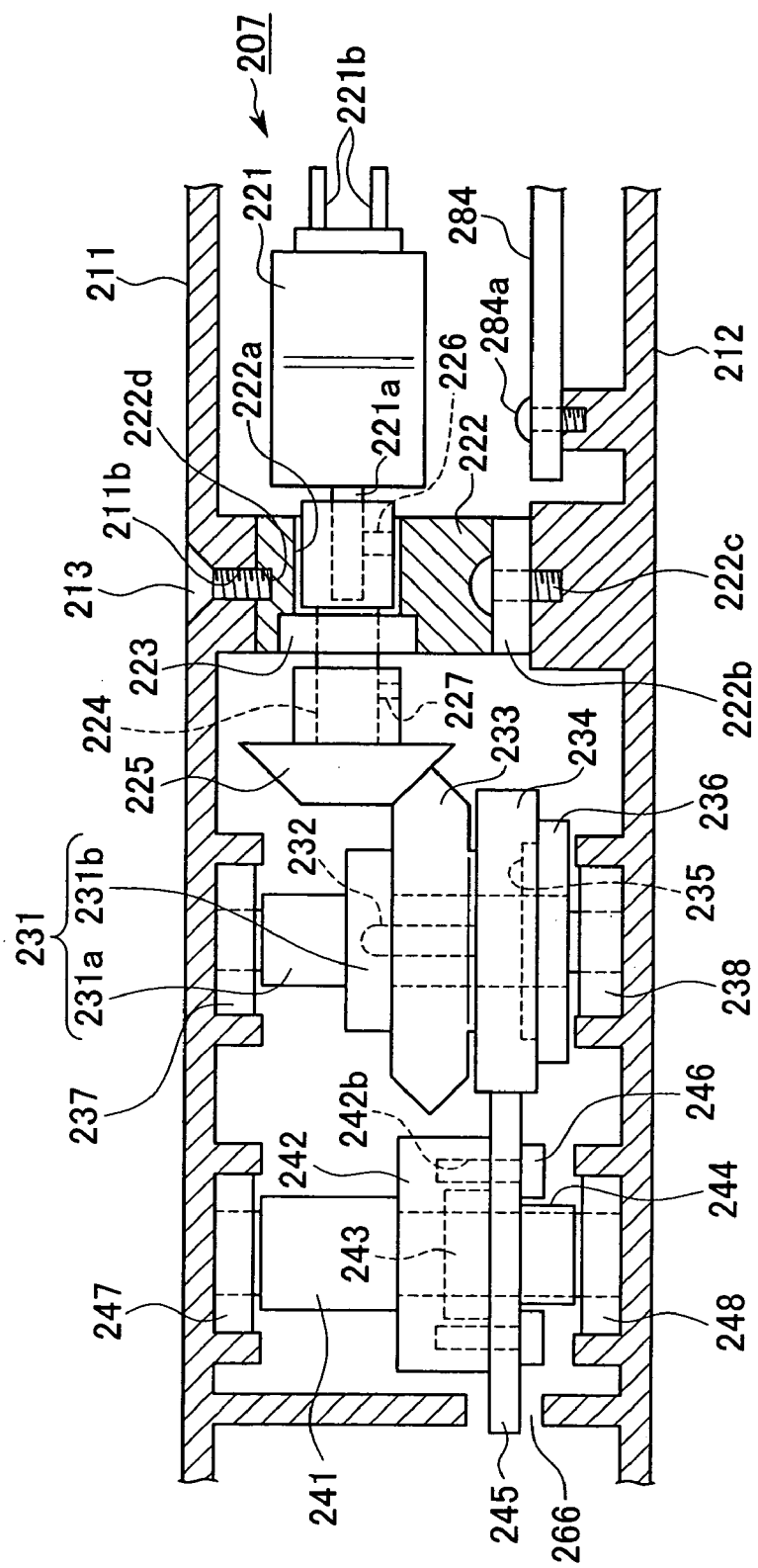
FIG. 15 is a cross-sectional view taken along the line B—B of the drive auxiliary unit of FIGS. 12A and 12B.
Figure 16:
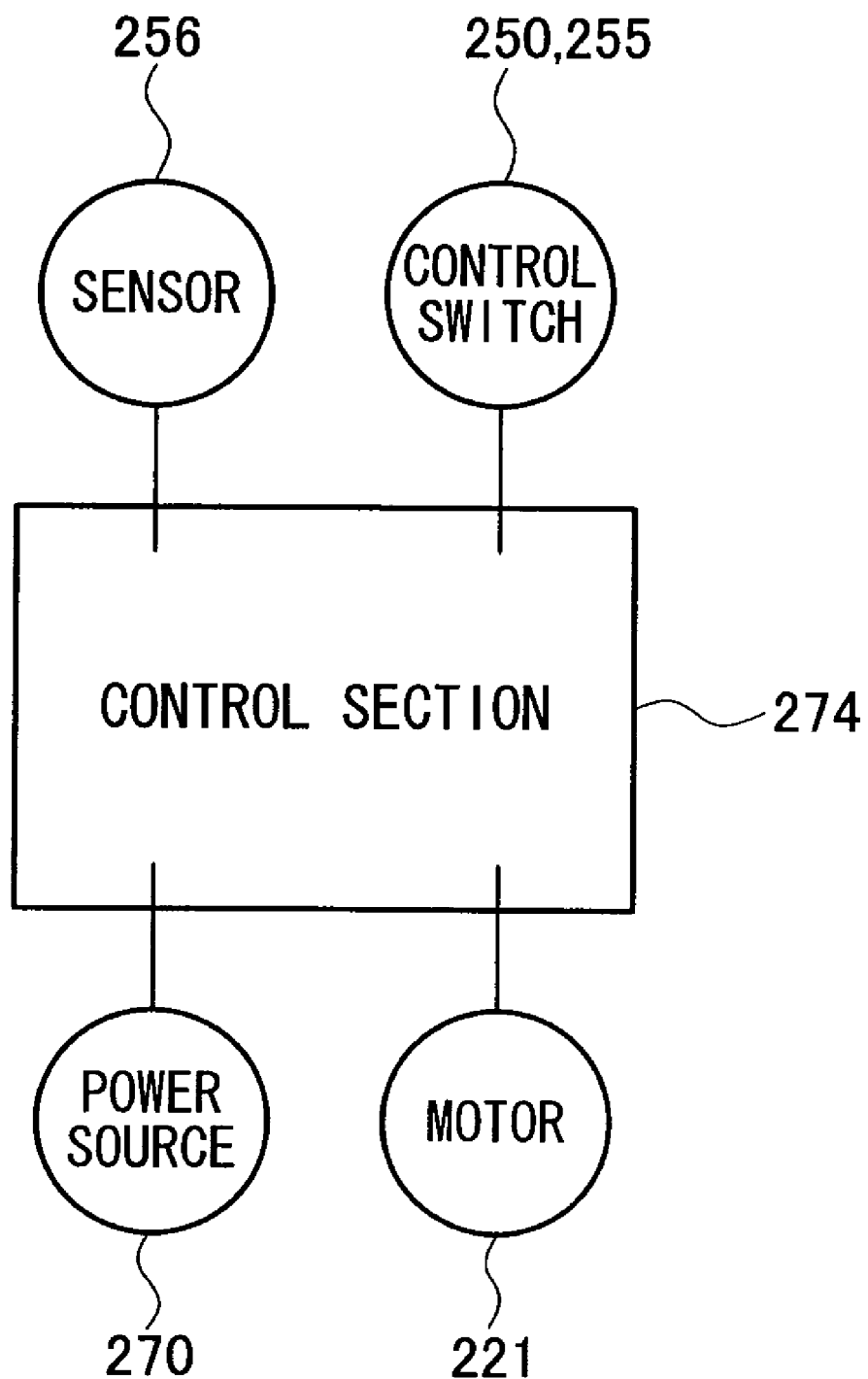
FIG. 16 is a schematic diagram showing the schematic constitution of an electrical circuit of the drive auxiliary unit of FIGS. 12A and 12B.

As shown in detail in FIG. 15, drive auxiliary mechanism 207 has a motor 221 as a source of driving force, powered by a battery 270 or the like. A terminal 221b of motor 221 is connected to the power source by an unillustrated cable.

Figure 14:
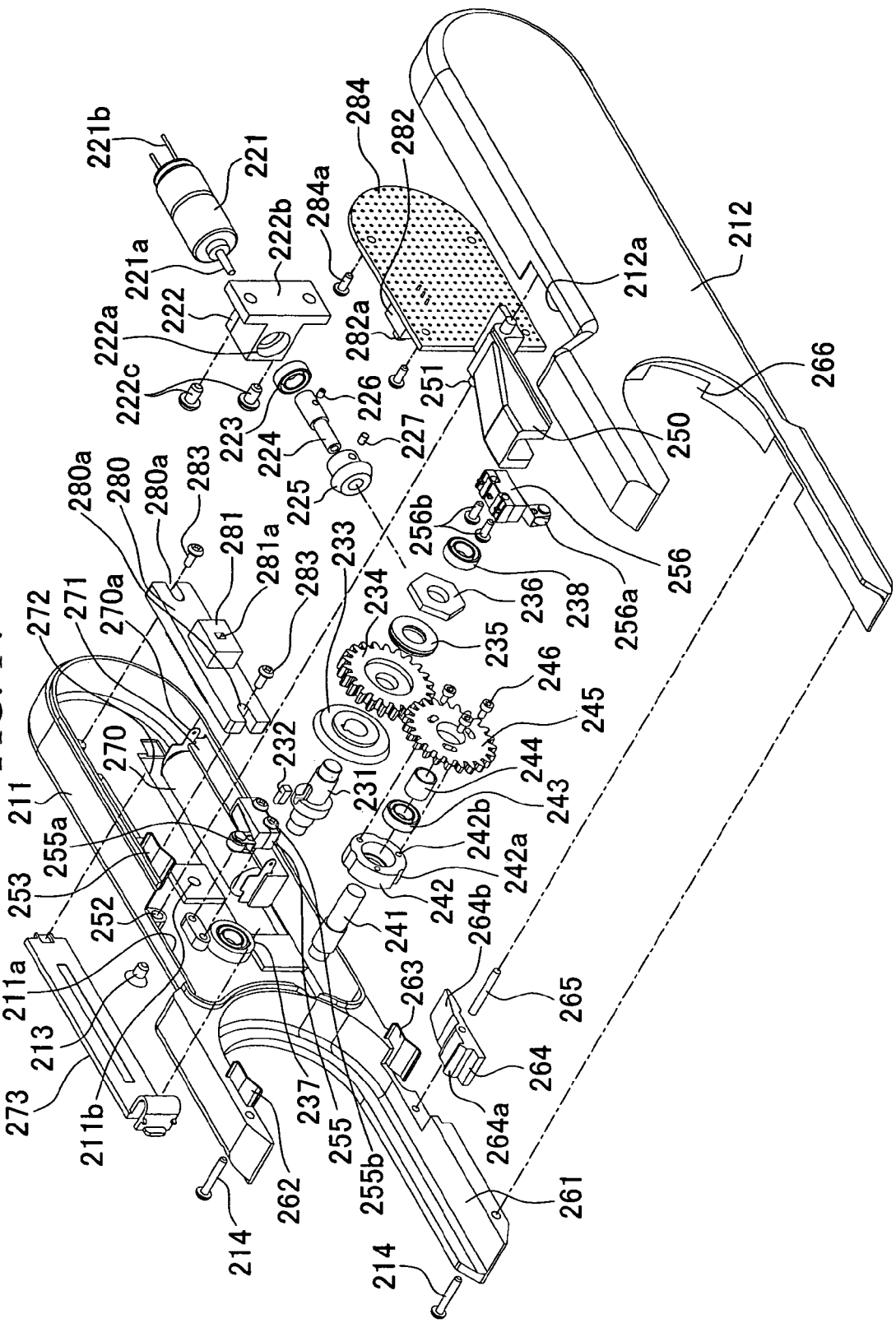
FIG. 14 is an exploded perspective view (No. 2) of the drive auxiliary unit of FIGS. 12A and 12B.

Battery 270 is placed in a battery box 271 on the bottom side of motor 221 (the bottom side in FIG. 14, the far side parallel to the page in FIG. 15). To replace battery 270, an open section 272 is provided in case half-body 221 and can be sealed by a lid 273, which can be freely attached and removed.

As is conventional with electrical devices in other fields, a jack for attaching an AC adaptor may be provided in the electrical circuit of drive auxiliary mechanism 207 to enable an external ac current to be used as the power source. It is also possible to selectively use either of the battery and the ac adaptor as the power source.

Drive axis 221a of motor 221 is secured to one end of a joint 224 by a securing member (screw) 226. A bevel gear 225 is secured to the other end of joint 224 by a securing member (screw) 227. The mid-section of joint 224 is rotatably held by a bearing 223, attached to a hole 222a in a bearing stand 222 which is secured to case 210.

Bearing stand 222 is secured to case 210 by fixing a flange section 222b to case half-body 212 by using a screw 222c, and screwing a screw 214 into a screw hole 222d in bearing stand 222 via a hole 211b in case half-body 211.

Bevel gear 225 meshes with a bevel gear 233 whose rotational shaft is parallel to that of bevel gear 225. Bevel gear 225 is attached to the outer periphery of shaft section 231a of a flange-fitted shaft 231 in such a manner that the torque from flange-fitted shaft 231 can be transmitted via a key 232. Bevel gear 225 is positioned between flange section 231b of flange-fitted shaft 231 and the side face of a gear 234.

Gear (spur gear) 234 is positioned so as to mesh with the above-described gear (spur gear) 245, and is prevented from falling out shaft axial section 231a by a nut 236, fitted into an unillustrated screw section in shaft section 231a of flange-fitted shaft 231. A washer 235 is provided between gear 234 and nut 236. Both ends of flange-fitted shaft 231 are held by bearings 237 and 238 on the inner faces of case half-bodies 211 and 212 so as to freely rotate.

Gear 245 is screwed into screw hole 242b of a cam 242 by three screws 246. A bearing 243 is provided between cam 242 and gear 245. Bearing 243 is fitted around the outer periphery of shaft 241. Both ends of shaft 241 are held by bearings 247 and 248 on the inner faces of case half-bodies 211 and 212 so as to freely rotate. To prevent gear 245 from deviating in the long direction of shaft 241, a sleeve 244 is provided as a spacer around the outer periphery of shaft 241 between bearing 243 and bearing 247.

Cam 242 has grooves 242a (the number of grooves is not restricted; three grooves are shown in FIG. 14) at equal intervals in its outer periphery. A sensor for detecting the amount of rotation of cam 242 comprises a limit switch 256, which is screwed to case 210 by a screw 256b, so that a wheel of an operating piece (wheel-fitted lever) 256a directly contacts the outer periphery of cam 242. Limit switch 256 switches the current OFF when the wheel has locked into groove 242a in cam 242, and switches the current ON when the wheel is removed from groove 242a. That is, the amount of rotation of gear 245 can be electrically detected as the output from limit switch 256 (unit for detecting amount of rotation).

A level-system control switch 250 is provided on the top side of case 210. Control switch 250 is attached to case 210 so as to freely turn, by inserting both ends of shaft 251 into holes 252 provided in case half-bodies 211 and 212 (FIG. 14 shows only hole 252 in case half-body 211 side). A limit switch 255 is provided in the bottom side of control switch 250, and, when control switch 250 is pressed, operating piece (wheel-fitted lever) 255a of limit switch 255 is pressed, outputting electrical signal as a trigger. After control switch 250 has been pressed, a spring 253 returns it to its original position.

Limit switch 255 is attached to case 210 (case half-body 211) by a screw 255b.

A screw 284 secures a circuit board 284 to case 210 (case half-body 212). Circuit board 284 has a control section 274 such as an IC. As shown schematically in FIG. 16, control section 274 connects power source 270, motor 221, limit switch 255 for detecting the control of control switch 255, and sensor (limit switch) 256 for detecting the amount of rotation of gear 245.

The operation of drive auxiliary mechanism 207 in this embodiment will be explained. When control switch 250 is operated by pressing it, based on the trigger signal output from limit switch 255, electricity is supplied from power source 270 to motor 221 in compliance with the control of control section 274, whereby motor 221 starts to operate, driving cleaning tape 2 and starting the cleaning of the optical connector. When sensor 256 detects that the fixed amount of cleaning tape 2 (determined by the interval between grooves 242a in cam 242) has been carried, and the circuit with sensor 256 is disconnected, motor 221 stops, and then cleaning tape 2 stops. By providing drive auxiliary unit 205 with this control function for automatically carrying a fixed amount of tape 2 at any time merely by pressing control switch 250, fluctuation in cleaning time arising from individual differences can be avoided, making it easy to achieve high cleaning effects.

It goes without saying that drive auxiliary unit 205 having a control function for stopping motor 221 by releasing the control of control switch 250, based on the time that control switch 250 is controlled, so that motor 221 is driven only during this time, is also included within the scope of the present invention.

The sensor is not limited to one which detects the rotation of gear 245, and can, for example, comprise a timer which measures the time elapsed since starting to drive motor 221, and the like.

A slide switch 282 is installed on circuit board 284, and switches the supply of electricity from power source 270 to the circuit ON and OFF. An approximately rectangular control slider 280 is provided to control slide switch 282 from outside case 210. Control slider 280 has notches 280a on both sides in the longitudinal direction thereof, and is able to slide within the length of the shaft section of two screws 283, which pass through notches 280a and are screwed into case 210 (case half-section 211). A boss 281 is provided in the inside of control slider 280 (the side at the front of the page in FIG. 14), and has a hole 281a which attaches to slider 282a of slide switch 282. Slide switch 282 can be controlled by sliding control slider 280.

According to cleaning tool 206, the join end face of the optical connector can be cleaned in the same manner as shown in FIGS. 6 and 7 of the first embodiment. At this time, drive auxiliary unit 205 connected to cleaning unit 201 can apply a driving force to drive mechanism 3 of cleaning unit 201. Of course, it is possible to clean with only cleaning unit 201, or by driving cleaning tape 2 manually by means of control dial 34.

FIGS. 17 to 20 show a third embodiment of the cleaning unit and the cleaning tool of the present invention. The same reference numerals as those used in FIGS. 1 to 7 represent the same or similar parts, and are not explained again.

Figure 17:
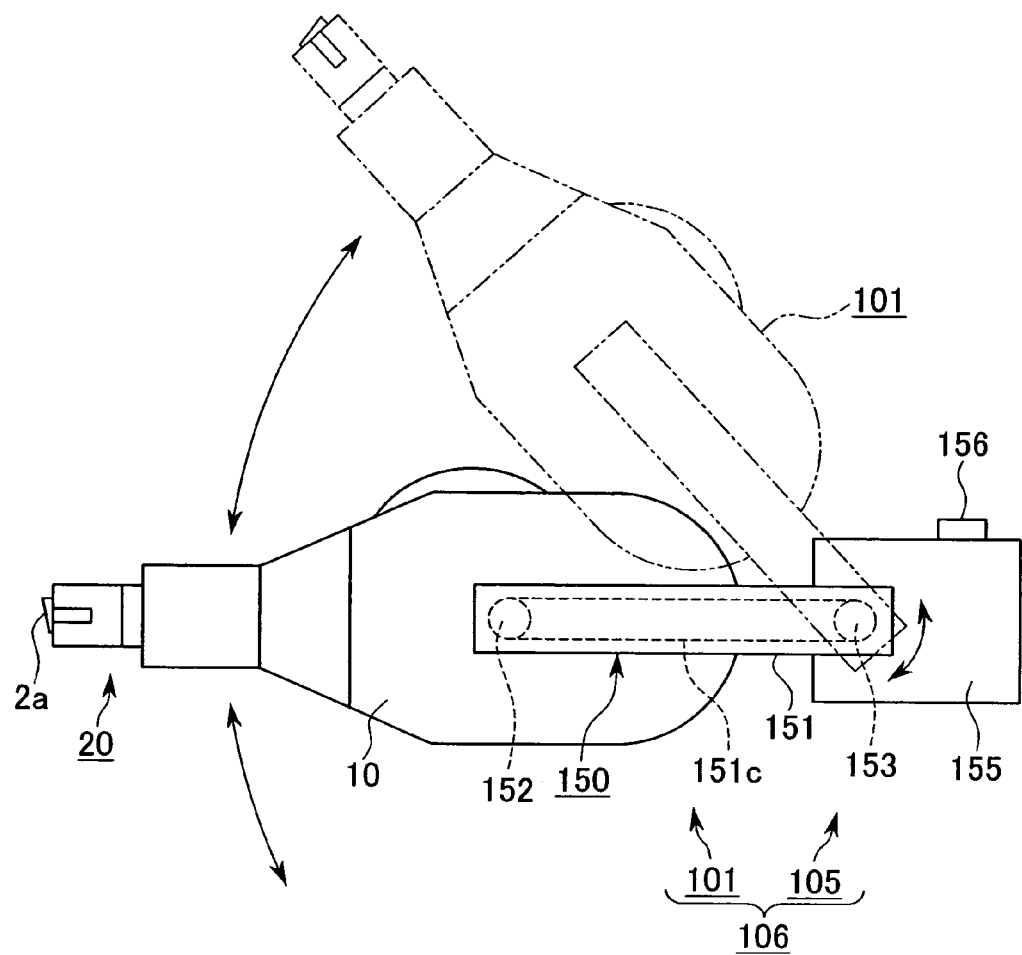
FIG. 17 is a perspective view of a third embodiment of the cleaning tool of the present invention.
Figure 18A:
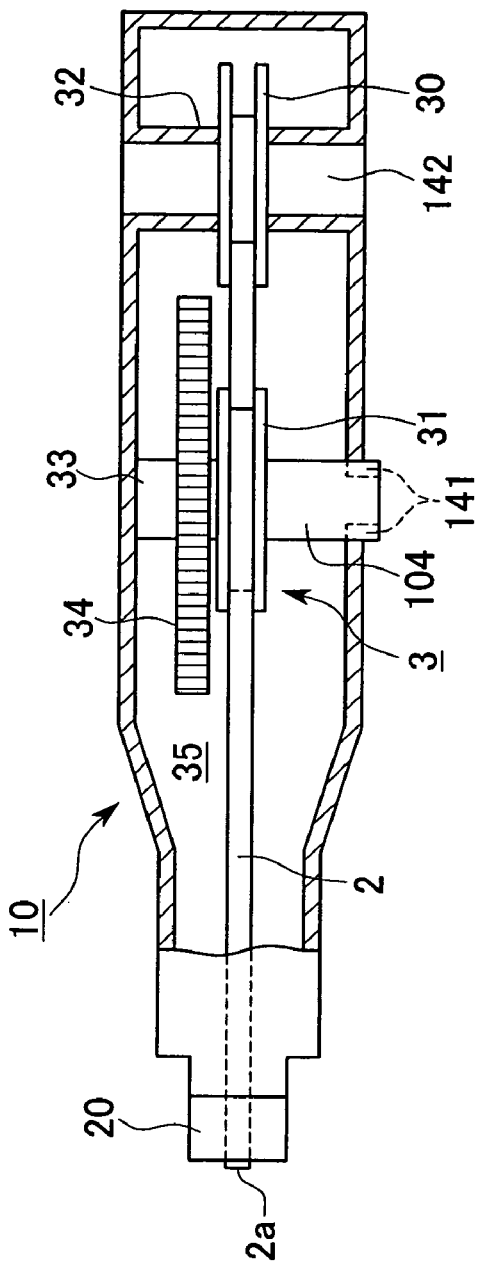
FIG. 18A is a vertical cross-sectional view from above the cleaning unit of the third embodiment.
Figure 18B:
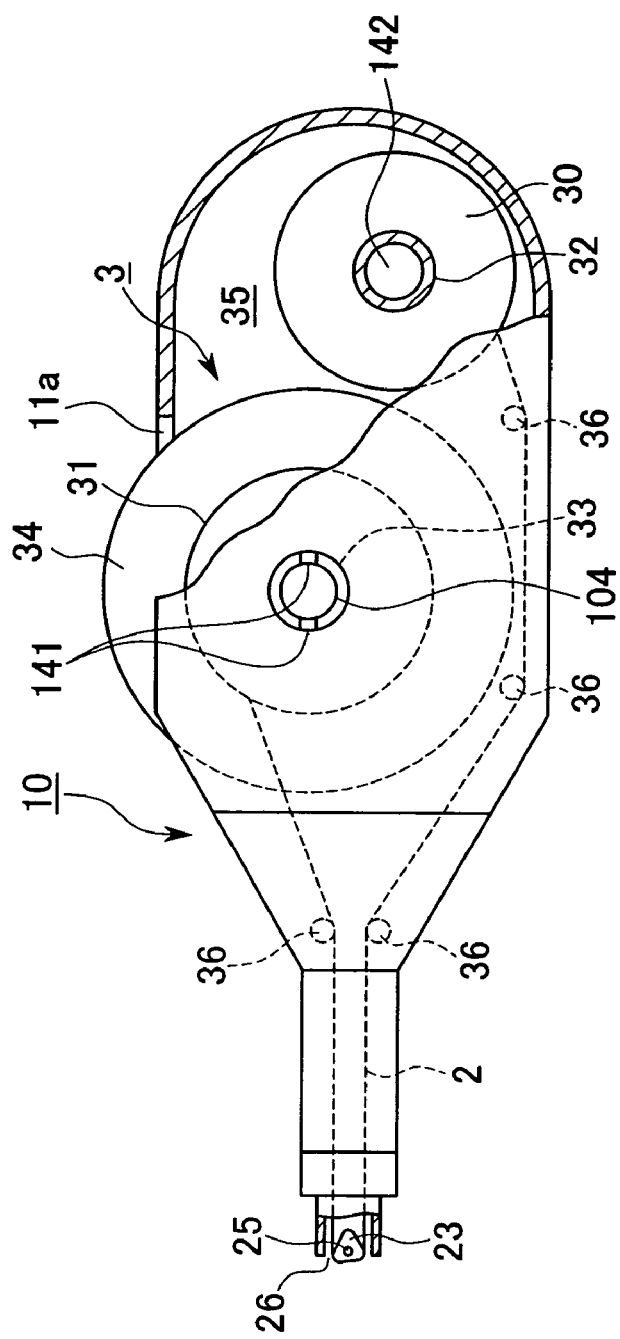
FIG. 18B is a partially cutaway cross-sectional view from the front of the cleaning unit of the third embodiment.

As shown in FIGS. 17 and 18, cleaning tool 106 of this embodiment comprises a drive auxiliary unit 105, which is connected to cleaning unit 101 as described later.

Cleaning unit 101 comprises insertion section 20 and drive mechanism 3, identical to those mentioned in the first embodiment. A split sleeve-like connection section 104 extends from the tip of collecting reel supporting shaft 33. Furthermore, a through-hole 142 is provided in the inner face of supply reel supporting shaft 32, and passes through unit main body 10 parallel to its width.

Figure 19:
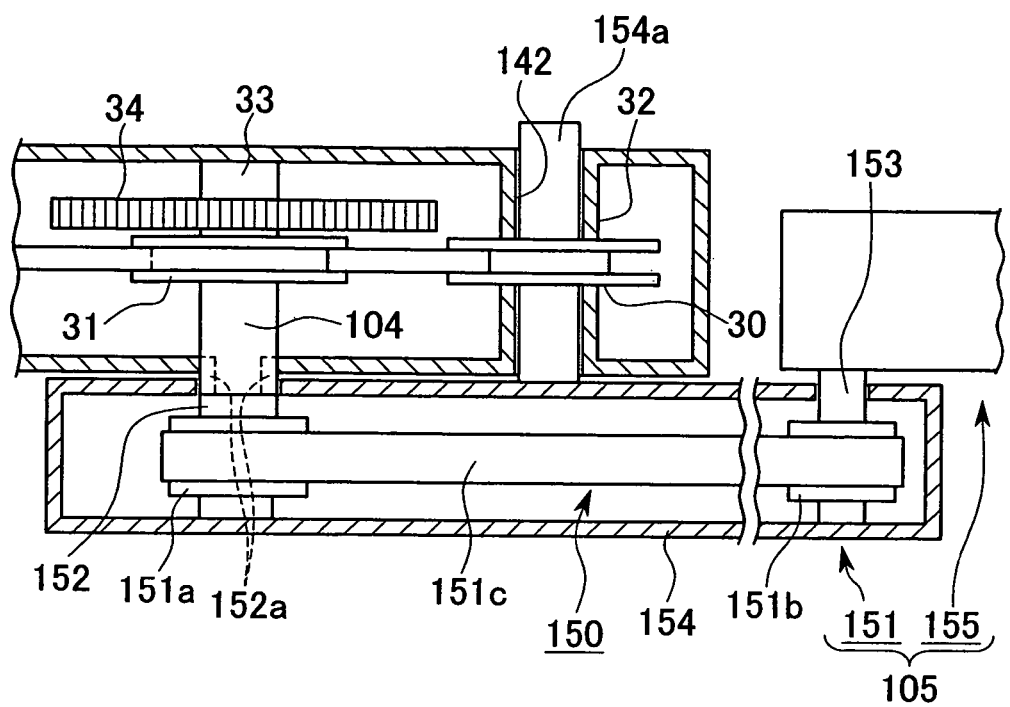
FIG. 19 is a partially cutaway cross-sectional view showing one example of a connection between a connection section and a drive auxiliary mechanism in the cleaning tool of the third embodiment.

As shown in FIGS. 17 and 19, drive auxiliary unit 105 comprises a grip section 155 having a drive switch 156, and a conduction section 151 which is connected to grip section 155 via a drive shaft 153 so as to be capable of freely rotating. As shown by the imaginary lines in FIG. 17, drive shaft 153 enables the angle between conduction section 151 and grip section 155 to be changed by an appropriate conventional constitution (unillustrated) such as a screw or ratchet mechanism.

Conduction section 151 comprises a connection shaft 152 which can be connected to connection section 104 of cleaning unit 101, belt wheels 151a and 151b, provided around the outer peripheries of connection shaft 152 and drive shaft 153, and a belt 151c which is wound around belt wheels 151a and 151b; the aforementioned parts are accommodated in a case 154. Drive auxiliary mechanism 150 transmits the rotational force of drive shaft 153, which is driven by an unillustrated power source (such as an electric motor) via belt 151c of conduction section 151, connection shaft 152, and the like, to drive mechanism 3 of cleaning unit 101.

As shown in FIG. 19, the end portion of connection shaft 152 faces outside case 154, and there are bumps 152a at the tip which can clip into notches 141 in connection section 104.

Cleaning unit 101 and drive auxiliary unit 105 can be stably connected without shaking by clipping bumps 152a of connection shaft 152 into notches 141 in connection section 104, and inserting a protrusion 154a, protruding from the side of case 154 which contains conduction section 151, into through-hole 142.

According to cleaning tool 106 described above, the join end face of the optical connector can be cleaned in the same manner as was illustrated in FIGS. 6 and 7 of the first embodiment. At this time, drive auxiliary unit 105 connected to cleaning tool 106 can apply a driving force to drive mechanism 3 of cleaning unit 101.

Figure 20:
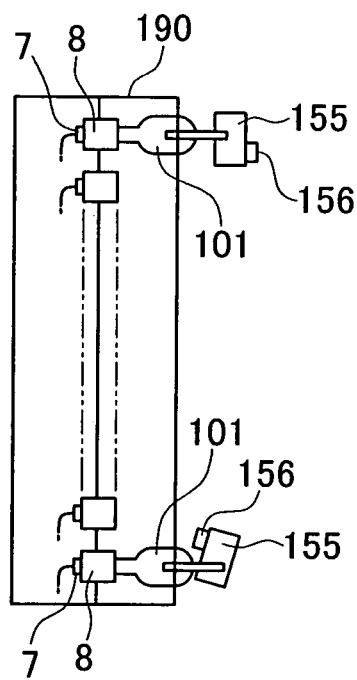
FIG. 20 is a plane view from above the cleaning tool of the third embodiment, showing an example in which the direction of the cleaning unit with respect to a grasping section has been changed.

By changing the angle between conduction section 151 and grip section 155, the direction of cleaning unit 101 with respect to grip section 155 can be changed. Therefore, as shown in FIG. 20, the join end face of an optical connector 7 inside a connector housing 8 in a high or low place, such as, for example, a termination cabinet 190, can be cleaned easily. Moreover, since drive switch 156 is provided to grip section 155, the drive to cleaning member 2 can be switched on and off by the hand used to grip cleaning tool 106.

The present invention is not limited to the preferred embodiments described above, and may be modified in various ways without deviating from the scope of the invention.

For example, the specific shape of the optical connector cleaning tool is not limited to that described in the embodiments, and may be changed appropriately in accordance with the shape of the optical connector to be cleaned.

In the unit main body, the insertion section comprises unit insertion sections at multiple places in the protruding direction, the unit insertion sections being positioned by insertion into different connector housings; the unit insertion sections of the insertion section can be inserted into all connector housings which can accommodate the unit insertion sections positioned relatively toward the rear side of the insertion section in the protruding direction. According to this cleaning unit, the unit insertion sections enable the insertion section to be inserted while positioning it with respect to different connector housings, making it possible to clean the join end faces of the optical connectors in the connector housing in accordance with the shape and size of the housing by using a single cleaning unit.

Furthermore, the insertion section may comprise multiple types of insertion sections which can be replaced in the unit main body. This makes it possible to clean the join end face of the optical connector in the connector housing in accordance with the shape and size of the connector housing, merely by changing the insertion section and without changing the unit main body.

In addition to tape, a conventionally known cleaning member such as a swab may be used. In the cleaning unit of the above embodiments, the insertion section completely covers the cleaning member, excepting the open section at the front tip of the insertion section, but there is not restriction on this. As long as the cleaning member is prevented from becoming dirty by touching the inner walls and the like of the connector housing when the insertion section is inserted into the connector housing, there are no restrictions on the shape or structure of the insertion section, and it need not be the shape of the housing.

The constitution of the drive auxiliary unit, which enables the angle of the optical connector cleaning unit with respect to the grip section to be changed to multiple alternatives, may be one wherein the angle of installation in the connection section between the cleaning unit and the drive auxiliary unit can be changed to multiple alternatives.

What is claimed is:

1. An optical connector cleaning unit comprising:
   a unit main body accommodating a cleaning member to wipe clean a join end face of an optical connector inside a connector housing by relative motion against the join end face;
   an insertion section which protudes from the unit main body and is insertable into the connector housing;
   a drive mechanism which drives the cleaning member;
   a first means for manually engaging the drive mechanism for driving the cleaning member;
   a drive auxiliary unit including a drive auxiliary mechanism;
   a connection section of the main body including a second means for engaging the drive mechanism at a location spaced from the first means, the second means adapted for engagement with the drive auxiliary mechanism of the drive auxiliary unit;
   wherein the cleaning member placed at a tip of the insertion section protruding from the unit main body is touched against the join end side with positioning by inserting the insertion section into the connector housing.

2. An optical connector cleaning unit according to claim 1, wherein the drive auxilliary unit comprises a drive auxiliary mechanism, a control switch, and a control section for driving the drive auxiliary mechanism; and the control section activating the drive auxiliary mechanism based on an operation of the control switch.

3. The optical connector cleaning unit according to claim 2, wherein the drive auxiliary unit further comprises a sensor for directly or indirectly detecting an operation amount of the cleaning member; and
   the control section activates the drive auxiliary mechanism based on an operation of the control switch, and controls the drive of the drive auxiliary mechanism basded on the operation amount of the cleaning member, detected by the sensor.

4. The optical connector cleaning unit according to claim 1, wherein a transmission path between the drive auxiliary mechanism and the connection section is connected by the interlocking of gears.

5. The optical connector cleaning unit according to claim 1, wherein the drive auxiliary unit comprises a grip section for gripping the optical connector cleaning unit, it being possible to change the angle of the optical connector cleaning unit with respect to the grip section to multiple alternative angles.

* * * * *